United States Patent
Deshpande et al.

(10) Patent No.: US 10,298,398 B2
(45) Date of Patent: May 21, 2019

(54) PEER DISCOVERY, CONNECTION, AND DATA TRANSFER

(71) Applicant: Google Inc., Mountain View, CA (US)

(72) Inventors: Vinit Deshpande, San Jose, CA (US); Amit Joshi, Menlo Park, CA (US); Sanjeev Radhakrishnan, San Jose, CA (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 15/393,185

(22) Filed: Dec. 28, 2016

(65) Prior Publication Data

US 2018/0183596 A1    Jun. 28, 2018

(51) Int. Cl.
| | | |
|---|---|---|
| *H04L 9/08* | (2006.01) | |
| *H04L 9/32* | (2006.01) | |
| *H04W 4/80* | (2018.01) | |
| *H04L 29/06* | (2006.01) | |
| *H04W 12/02* | (2009.01) | |

(52) U.S. Cl.
CPC .......... *H04L 9/3226* (2013.01); *H04L 9/0833* (2013.01); *H04L 63/0442* (2013.01); *H04W 4/80* (2018.02); *H04W 12/02* (2013.01); *H04L 63/083* (2013.01); *H04L 2209/80* (2013.01)

(58) Field of Classification Search
CPC ......... H04L 9/3226; H04L 63/06; H04L 9/30; H04L 9/14; H04L 63/0428; H04L 2209/80; H04W 4/80; H04W 12/04
See application file for complete search history.

(56) References Cited

U.S. PATENT DOCUMENTS

| | | | |
|---|---|---|---|
| 7,340,612 B1* | 3/2008 | Durand | H04L 63/062 713/182 |
| 8,233,495 B2* | 7/2012 | Qi | H04L 41/12 370/431 |
| 9,220,012 B1* | 12/2015 | Inamdar | H04W 12/08 |
| 2005/0232422 A1* | 10/2005 | Lin | H04K 1/00 380/255 |
| 2006/0053289 A1* | 3/2006 | Singh | H04L 9/3273 713/169 |
| 2009/0217043 A1* | 8/2009 | Metke | G06F 21/445 713/171 |
| 2012/0216039 A1* | 8/2012 | Franklin | H04L 63/06 713/168 |
| 2012/0284517 A1* | 11/2012 | Lambert | H04L 63/0823 713/169 |
| 2013/0275758 A1* | 10/2013 | Marlow | H04L 9/0861 713/171 |
| 2015/0066778 A1* | 3/2015 | Jang | G06Q 20/3829 705/71 |
| 2015/0348055 A1* | 12/2015 | Smits | G06Q 30/018 705/317 |
| 2016/0065362 A1* | 3/2016 | Choyi | H04L 63/065 380/279 |
| 2016/0085861 A1* | 3/2016 | Vecera | G06F 17/30864 713/168 |
| 2016/0119415 A1* | 4/2016 | Han | H04L 65/1069 709/227 |
| 2016/0198344 A1* | 7/2016 | Oba | H04W 12/06 455/411 |
| 2017/0041304 A1* | 2/2017 | Tal | G06F 1/32 |
| 2017/0064753 A1* | 3/2017 | Zhao | H04W 76/14 |

* cited by examiner

*Primary Examiner* — Michael Pyzocha
(74) *Attorney, Agent, or Firm* — IP Spring

(57) ABSTRACT

Implementations relate to peer-to-peer discovery, connection, and data transfer providing privacy protection and increased security features.

20 Claims, 15 Drawing Sheets

PEER DISCOVERY, CONNECTION, AND DATA TRANSFER

BACKGROUND

Users of mobile devices (e.g., smart phones, wearable devices, etc.) often exchange data (e.g., images, videos, audio, text, etc.) among devices. Data exchanges can be accomplished via a cloud infrastructure accessed via a network when a network is present, the cloud infrastructure is available, and the devices have features supporting the cloud access via the network connection. However, in some situations, the network and/or cloud infrastructure may not be available, and/or one or more devices may not be able to connect to the network or the cloud infrastructure. In these situations, a peer-to-peer data transfer may be used that includes establishing a device-device connection.

In some instances of peer-to-peer data transfer, a given user may exchange data with one or more other users that are known to the given user. In other instances, a given user may wish to exchange data with another user that is not known to the given user. Such data exchanges may be through cloud-based services or through a peer-to-peer type connection that operates from one user device to another user device. As mentioned above, there may be situations in which a cloud-based transfer is not available and a peer-to-peer data transfer may used in such situations. Also, a peer-to-peer data transfer may help reduce or eliminate cellular data charges that may be incurred in some instances when accessing a cloud-based service from a mobile device.

In order to form a peer-to-peer connection, user devices may need to provide a signal that advertises an identity and/or presence of the user so that another user can request a connection to a specific user. However, some users may not wish to advertise identity or presence to other unknown users. Also, under certain circumstances, a higher level of security or confidence in forming a peer-to-peer connection may be used. Thus, some implementations may provide a peer-to-peer discovery and connection protocol that can preserve user privacy and can provide increased security. Some implementations have been conceived in light of the above problems, limitations and needs.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to update and display of panoramic image montages. In some implementations, a computer-implemented method can include obtaining, at a sender device, a public key of a receiver device, and receiving, at the sender device, a beacon signal transmitted by the receiver device, wherein the beacon signal includes an encoded value. The method can also include determining, by the sender device, if the encoded value of the beacon signal is decodable with the public key of the receiver device. The method can further include transmitting, by the sender device, a connection provisioning message, wherein the connection provisioning message includes an encrypted portion that is encrypted using the public key of the receiver device when it is determined that the encoded value of the beacon signal is decodable with the public key of the receiver device.

In some implementations, the encoded value can be based on a salt value and the public key of the receiver device. The method can also include decoding the encoded value to determine the salt value, and, based on the salt value, determining a time at which the salt value was generated.

In some implementations, transmitting the connection provisioning message can be performed in response to determining that the time at which the salt value was generated is within a threshold time from a current time at the sender device. Obtaining the public key of the receiver device can include one or more of receiving the public key of the receiver device via device to device transfer between the receiver device and the sender device, a cloud-based transfer between the receiver device and the sender device, and personal identification number (PIN) exchange between the receiver device and the sender device.

In some implementations, the public key of the receiver device can include at least a portion of a phone number associated with the receiver device. The encrypted portion of the connection provisioning message can include an identifier for a wireless network and a password for the wireless network. The wireless network includes a Wi-Fi hotspot. In some implementations, the beacon signal can be received via a first communication channel, the connection provisioning message can be transmitted via the first communication channel, and the encrypted portion of the connection provisioning message can include access credentials for a second communication channel that is different from the first communication channel.

Some implementations can include a computer-implemented method that can include generating, at a receiver device, a key pair that includes a public key and a private key, and transmitting, from the receiver device, a beacon signal that includes a salt value and an encoded value based on the salt value and the public key, wherein the beacon signal is transmitted via a beacon signal communication channel. The method can also include receiving, at the receiver device, a connection provisioning message from a sender device, the connection provisioning message having an encrypted portion that includes credentials to access a network associated with a transfer communication channel, and determining if the encrypted portion of the connection provisioning message can be decrypted using the private key. The method can further include, when it is determined that the encrypted portion of the connection provisioning message can be decrypted with the private key, establishing, at the receiver device, a secure connection to the network using the credentials in the encrypted portion of the connection provisioning message.

The method can also include transmitting, from the receiver device, a content request message to the sender device via the secure connection, and receiving, at the receiver device, a content description message from the sender device in response to the content request message via the secure connection. The method can further include transmitting, from the receiver device, a download start message to the sender device via the secure connection, and receiving, at the receiver device, one or more content download messages from the sender device via the secure connection.

In some implementations, the transfer communication channel can be different from the beacon signal communication channel used to transmit the beacon signal from the receiver device. In some implementations, the beacon signal communication channel can include Bluetooth and the transfer communication channel includes Wi-Fi.

In some implementations, the salt value can include a time-based component configured to permit determination of a time that the salt value was generated at the receiver device. Transmitting the beacon signal can include transmitting the beacon signal via Bluetooth Low Energy (LE). The public key can include a phone number associated with the receiver device.

Determining if the encrypted portion of the connection provisioning message can be decrypted using the private key of the receiver device can further include determining that the connection provisioning message cannot be decrypted using the private key of the receiver device, and sending, from the receiver device to the sender device, an indication that a key used to encrypt the encrypted portion of the connection provisioning message is invalid, when the connection provisioning message cannot be decrypted using the private key of the receiver.

Some implementations can include a system comprising one or more processors coupled to a non-transitory computer readable medium having stored there on software instructions that, when executed by the one or more processors, cause the one or more processors to perform operations. The operations can include obtaining, at a sender device, a public key of a receiver device, and receiving, at the sender device, a beacon signal transmitted by the receiver device, wherein the beacon signal includes an encoded value. The operations can also include determining if the encoded value of the beacon signal is decodable with the public key of the receiver device.

The operations can further include, when it is determined that the encoded value of the beacon signal is decodable with the public key of the receiver device, transmitting from the sender device to the receiver device a request for personal identification number (PIN) verification including a PIN, and determining, based on input received from a user interface of the sender device, that the PIN transmitted to the receiver device is verified by the sender device. The operations can also include, when the PIN is verified, transmitting a connection provisioning message from the sender device to the receiver device, wherein the connection provisioning message includes an encrypted portion encrypted using the public key of the receiver device, wherein the encrypted portion of the connection provisioning message includes credentials to access a network associated with a transfer communication channel.

In some implementations, the sender device can be connected to the transfer communication channel prior to receiving the beacon signal. The encoded value of the beacon signal can be based on a salt value and the public key of the receiver. The operations can also include decoding the encoded value to determine the salt value, and, based on the salt value, determining a time at which the salt value was generated.

In some implementations, the transmitting the connection provisioning message can be performed in response to determining that the time at which the salt value was generated is within a threshold time from a current time at the receiver device. In some implementations, the beacon signal is received over a beacon communication channel that includes Bluetooth and the transfer communication channel includes Wi-Fi.

DETAILED DESCRIPTION

Figure 1:
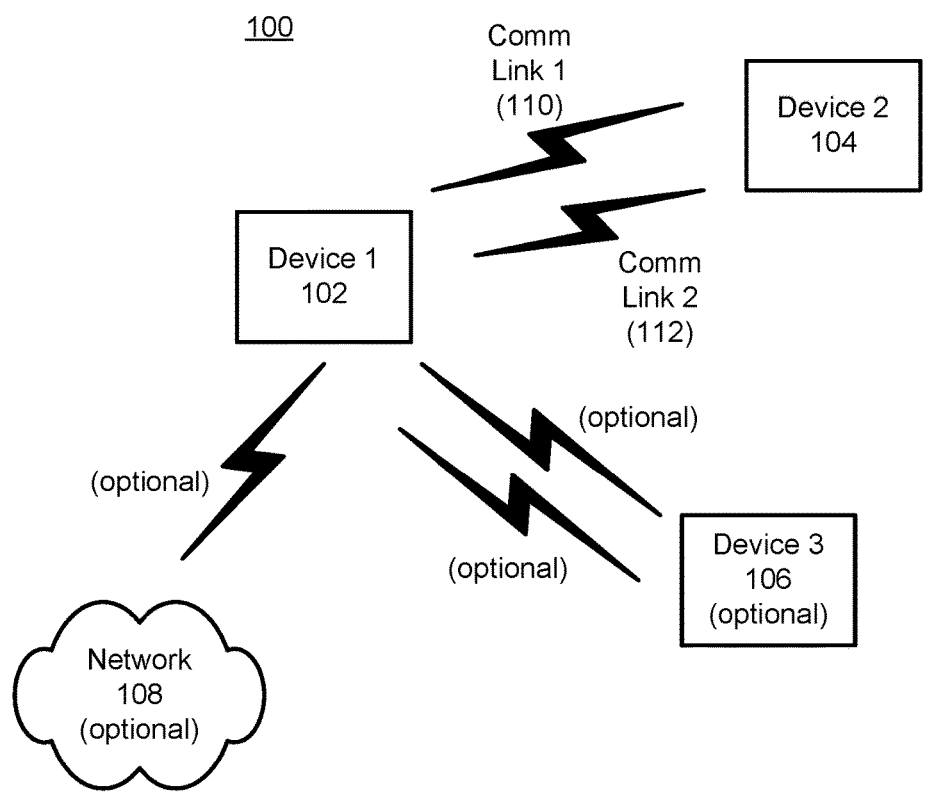
FIG. 1 is a block diagram of example user devices and a communications environment that may be used for one or more implementations described herein.

One or more implementations described herein relate to a peer-to-peer sharing techniques and protocol that can be performed between devices having wireless communication capabilities. In various implementations, the peer-to-peer sharing method can include discovery, connection and data transfer phases. In some implementations, the peer-to-peer sharing method may be performed between devices that are "offline", e.g., not connected to a network or cloud infrastructure or other devices that are remote, in a device-to-device manner.

Some implementations can include a contact-centric user experience, e.g., data sharing may occur frequently between users that are friends, family, co-workers, or have some other connection such that the users are "contacts" of one another. Wireless devices (e.g., smart phones, wearable devices, tablets, computers, etc.) typically have a contact database that contains contact information. Contact information in a user device contact database can include one or more of a name (e.g., a legal name, a nickname, a username of the user in one or more services, etc.), a phone number, an email address, an instant messaging identifier, a social network identifier, etc.

Many wireless devices have multiple wireless communication features such as cellular radio, Wi-Fi radios, and Bluetooth support features. Some wireless devices may also provide a Wi-Fi hotspot, e.g., wireless devices may be able to provide a Wi-Fi connection (e.g., a connection that uses IEEE 802.11 protocol) to another device.

One concern users of mobile devices may have is that use of cellular data (e.g., transfer of data over a cellular data connection of the wireless device) for a data transfer may exhaust a remaining allocated amount of cellular data transfer for a user's cellular plan (e.g., a billing plan that includes a limited amount of data transfer between a user device and the cellular network) or may cause overage charges if the cellular data transfer exceeds an amount provided by the user's plan. Some implementations may seek to provide peer-to-peer data transfer capability while reducing use of cellular data or not relying on cellular data transfer.

In various implementations, peer-to-peer data transfer may be implemented with techniques of this disclosure between user devices that are in close geographic proximity with each other. For example, two devices may be in close geographic proximity when they can communicate with each other wirelessly, without an intervening third device, such as a cellular base station. For example, user devices may communicate with each other using wireless protocols such as Bluetooth™, Bluetooth LE, or similar protocols that support short-range wireless communication As mentioned above, peer-to-peer data transfer per techniques of this disclosure can include three phases: discovery, connection, and data transfer. In some implementations, the discovery phase can include advertising the presence of a user device to other user devices and scanning for presence of other user devices. In some implementations, the discovery phase can utilize Bluetooth technology (e.g., classic Bluetooth, or Bluetooth low-energy (LE), if available on the device). In some implementations, a token used in the discovery process can include a token encoded using a user's phone number. Such a token can be used to generate a Bluetooth name of the device when advertising presence of the device via Bluetooth. In some implementations, advertisement/scanning may be carried out when the peer-to-peer connection application is in the foreground on a device or otherwise has focus. Application focus can include the application being in the foreground, the application having display focus (e.g., an active window or tab in a user interface, the application having touch input focus, having keyboard input focus, microphone input focus, video input focus, or other input mode focus, etc.

An example connection phase can utilize a secure Wi-Fi hotspot technology provided by one device (e.g., a device of a first user) and Wi-Fi station functionality provided by another device (e.g., a device of a second user). The Wi-Fi hotspot service set identifier (SSID)/password can be provisioned over the connection used for discovery (e.g., classic Bluetooth). The connection phase can establish a connection having a download data transfer model in which a sender device hosts a server and a receiver device connects to the server hosted by the sender device. In some implementations, the connection phase can also include an optional secondary authentication (e.g., authentication based on transport layer security (TLS), secure sockets layer (SSL), or the like). Encryption during the connection phase may be optional. In some implementations that use encryption during the connection phase, such encryption may be based on keys from the secondary authentication. Some implementations can utilize Wi-Fi Direct technology to establish a connection between devices. Wi-Fi Direct provides Wi-Fi Direct Hotspot and Wi-Fi Direct Station, which can operate concurrently with regular Wi-Fi Hotspot and Wi-Fi Station.

In some implementations, the data transfer phase can include using transfer control protocol (TCP) and optionally, TLS. Downloads may be restartable or non-restartable depending on a contemplated implementation. In different implementations, the connection may persist (e.g., be kept in place) after a download completes or may be terminated upon completion of a download.

Some implementations can include a transfer protocol that utilizes a download-based transfer technique. The download model may provide an advantage of allowing for receiver authentication. Receiver authentication may be advantageous, e.g., to ensure that personal data such as photos, videos, etc. of a user are not shared with unauthorized users. In some implementations, an ability to validate a device to which data is being transferred may also be provided. The download model provides an ability to authenticate and authorize a data receiver.

In some implementations, the download model also provides for restartable transfers. For example, when a receiver requests data to be downloaded, the receiver can also communicate that it has already received a partial data transfer, which can permit the sender device to optimize data transfer (e.g., by not sending redundant bytes, etc.).

In some implementations, the download-based transfer technique also facilitates multiparty transfer as a plurality of users may download at the same time. The download-based transfer technique can also help optimize a single sender device sending to a single receiver device. Sending data from a hotspot may be faster due to an avoidance of data packets colliding with beacon packets, for example. The download-based transfer technique also permits a sender device to setup a hotspot and wait for a receiver to connect to the hotspot. Transfer control protocol (TCP) provides an underlying transport for TLS, which may be used for privacy.

FIG. 1 illustrates a block diagram of example user devices and a communications environment 100 that may be used for one or more implementations described herein. In some implementations, communications environment 100 includes one or more user devices, e.g., user devices 102, 104, and 106 in the example of FIG. 1. User devices (102, 104, and 106) can communicate among one another and with a network 108 (optional), for example. Network 108 can be any type of communication network, including one or more of the Internet, local area networks (LAN), wireless networks, switch or hub connections, etc. In some implementations, user devices (e.g., 102, 104, and 106) can establish peer-to-peer communications between two or more user devices, e.g., using one or more wireless channels and/or protocols. The peer-to-peer wireless communication channels (e.g., 110 and 112 shown in FIG. 1) can include a beacon signal communication channel (e.g., Bluetooth) and a transfer communication channel (e.g., Wi-Fi, Wi-Fi Direct, etc.). The wireless communication channels can include one or more of Wi-Fi (e.g., hotspot and/or station), Wi-Fi Direct (hotspot and/or station), Bluetooth (classic, LE, etc.), cellular, near field communication (NFC), infrared, ANT, ANT+, global position system (GPS), etc.

The user devices (e.g., 102, 104, and 106) can be any type of electronic device, e.g., a desktop computer, laptop computer, portable device (e.g., handheld), cell phone, smart phone, tablet computer, television (TV), TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. A user device can be a mobile device that can be any handheld or wearable device. Some user devices may also have a local database or other storage. In some implementations, communications environment 100 may not have all of the components shown and/or may have other elements including other types of elements instead of, or in addition to, those described herein.

Figure 2:
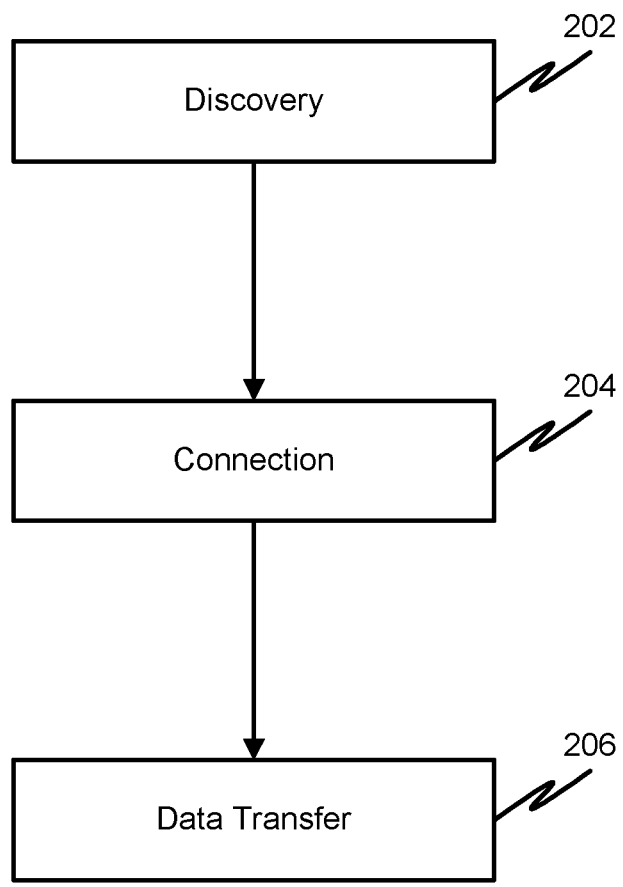
FIG. 2 is a flow diagram illustrating an example method to provide peer-to-peer discovery, connection and transfer, according to some implementations.

In operation, a first user device (e.g., 102) can perform a method as shown in FIG. 2 that can include discovery (e.g., advertising/scanning) 202, connection 204, and data transfer 206 with a second user device (e.g., 104). It will be appreciated that any user device having a peer-to-peer transfer application as described herein can operate as a sender device, a receiver device, or a sender and receiver device for peer-to-peer communication purposes. The details of an example peer-to-peer connection having the three phases mentioned above is shown in FIG. 3 and described below.

Figure 3:
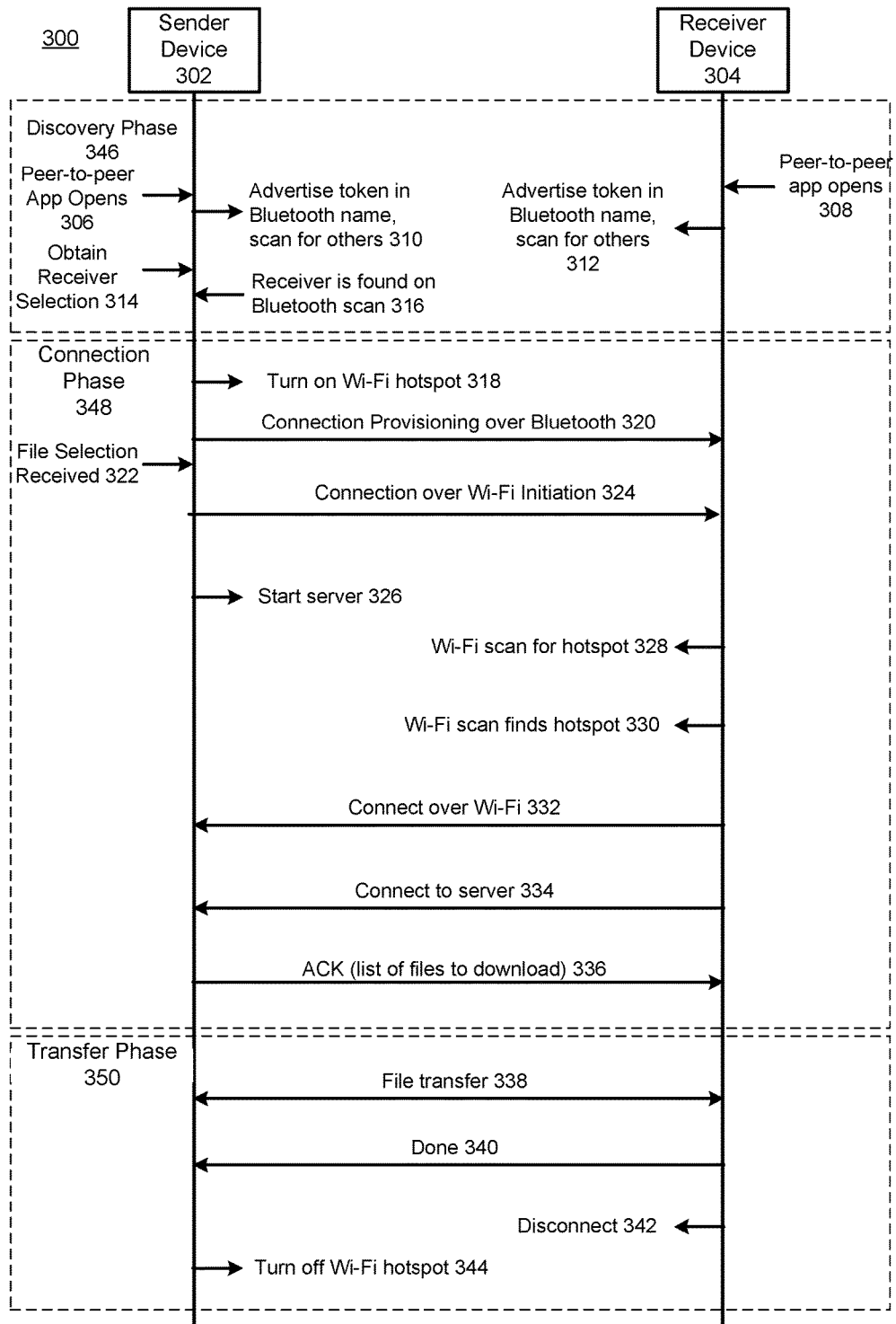
FIG. 3 is a flow diagram illustrating an example method to provide peer-to-peer discovery, connection and transfer, according to some implementations.

FIG. 3 is a flow diagram illustrating an example method 300 to provide peer-to-peer discovery, connection and transfer, according to some implementations. In this example, a sender device 302 and a receiver device 304 are shown establishing a peer-to-peer connection for data transfer purposes. In the example shown in FIG. 3, the peer-to-peer connection includes a discovery phase 346, a connection phase 348, and a transfer phase 350.

Processing begins in the discovery phase 346, where a first peer-to-peer application 306 is in the foreground on a sender device (e.g., 302) and a second peer-to-peer application 308 is in the foreground on a receiver device (e.g., 304). The first user device advertises (310) a first user token (e.g., beacon message) and scan for others (e.g., other devices that are executing a peer-to-peer application and advertising a token), and the second user device advertises (312) a second user token (e.g., beacon descriptor message) and scan for others (e.g., other devices that are executing a peer-to-peer application and advertising a token). It will be appreciated that the sender device and the receiver device of any implementations described herein can include the sending and receiving functionality as described herein and either device can act as a sender device and/or a receiver device.

In some implementations, a phone number (or part of a phone number) associated with a respective user device may be used in the discovery phase for user devices to identify one another. In some implementations, a cryptographic key pair associated with the device may be used. A key pair may include a public key and a private key.

Some implementations may use a user name to identify an owner of a user device (or the currently logged on user of the device), a phone number (e.g., a phone number that a local subscriber identity module (SIM) is servicing, or an active subscriber identifier (ID) for multiple SIM phones), and a key pair that may be bound to a single instance of the peer-to-peer application. The public key can be shared with other users that are known, such as friends, family, coworkers, etc. or may be shared with other users that are unknown.

In various implementations, discovery can operate in two modes: online and background. For example, background discovery (or offline discovery) may be performed when a user is not actively interacting with the peer-to-peer application. For example, online discovery can be performed when the user is actively interacting with the peer-to-peer application (e.g., the application has focus).

In some implementations, online discovery can include using Bluetooth as a beacon signal communication channel. In these implementations, the user's presence is published via a service descriptor in Bluetooth Service Discovery Protocol (SDP), for example. The peer-to-peer application may interact with other peer-to-peer applications that support the same service descriptor. A Bluetooth name of the user device is treated as service payload, which can permit the name to include a string having 248 bytes or less, for example. Because this data is treated as a payload, it can be encoded into an actual payload in base64 format, for example.

Discovery can be implemented in other ways such as Bluetooth Low Energy (BLE), which may be suited for discovering devices and/or services. Similar to classic Bluetooth, BLE provides for scanning and advertising at the same time. The scanning/advertising duty cycles of BLE can be adjusted to get a discovery time against power consumption tradeoff that is acceptable.

Also, like classic Bluetooth, BLE uses an identifier (e.g., a globally unique identifier or GUID) to identify a specific service. The BLE GUID permits 32 bytes of service description, which can accommodate an abbreviated and complete descriptor. Further, the service description data is treated as "dumb bytes" in BLE. Thus, in some implementations that utilize BLE, the GUID may not be encrypted (e.g., in base64 or such readable format). In these implementations, the descriptor may have more space for the name. Also, low power consumption of BLE can permit background discovery, which can include devices being discovered and connected without the user launching the application.

In some implementations, discovery can be accomplished via Wi-Fi/Wi-Fi hotspot. In the Wi-Fi discovery model, a device with an active Wi-Fi hotspot can act as an advertiser and the Wi-Fi station can act as the scanner. The Wi-Fi SSID can be used as a service descriptor and can accommodate the abbreviated descriptor format.

Audio technology could potentially be used for discovery, e.g., by transmitting data using audio carrier waves as a carrier signal. The audio carrier waves can be sonic or ultrasonic. Audio technology may have a range limited to about 5 feet and some current implementations may provide 6-8 bytes of payload data at 96 baud.

Another technology for discovery is multicast domain name system (mDNS). mDNS has been adapted for use over Wi-Fi. With mDNS, the usage model can include responding to mDNS queries for the peer-to-peer application on Wi-Fi networks that a user device connects to. mDNS may be supported on a variety of user devices that may not support other discovery models, thus mDNS may provide a discovery model for these devices.

Wi-Fi Aware is designed to provide peer-to-peer Wi-Fi connectivity and permits nearby devices to discover each other using native Wi-Fi technology and without requiring a Wi-Fi AP. Further, Wi-Fi Aware permits data transfer between nearby devices.

Yet another discovery technology option is cloud-based discovery. In implementations that use cloud-based discovery, user devices may publish their location to a cloud service. The cloud service may communicate with respective user devices information regarding other user devices that are nearby (in geographic proximity).

In some implementations, the service discovery payload can include either an abbreviated phone number descriptor (e.g., for use in online discovery mode) as shown in Table 1 below, or a private descriptor (e.g., for use in offline or background discovery mode) as shown in Table 2 below. The descriptors (or beacon messages) can be transmitted as a beacon signal (e.g., via Bluetooth) when advertising from a receiver device to a sender device, or vice versa.

TABLE 1

Example Abbreviated Phone Number Descriptor format

| Field No. | Name | Size | Value | Comments |
|---|---|---|---|---|
| 1 | App-ID | 2 bytes | Literal 'CR' | Identifies that beacon is for peer-to-peer sharing application |
| 2 | Version | 1 byte | Literal 2 | Version identifier |
| 3 | Capabilities | 2 bytes | Combination of capability bits | Bit Definition<br>0 - Supports Bluetooth<br>1 - Supports Wi-Fi (2.4 GHz)<br>2 - Supports Wi-Fi (5 GHz)<br>3 - Supports BLE<br>4 - Supports Audio<br>5 - Supports Wi-Fi Direct<br>6 - Supports Wi-Fi Aware<br>7 - Supports compression |
| 4 | Salt | 4 bytes | A random number | Random number used in computing sign (or hash) |
| 5 | Encoded Value (e.g., Hash Value) | 8 bytes | Sign of abbreviated phone number and salt | Abbreviated phone number can include a number constructed by selecting a given number of digits (e.g., 7) of a phone number. For example, given a 10-digit phone number (XxX)YyY-ZzZZ, the digits corresponding to the capital letters can be selected, the other digits can be ignored.<br>In some implementations, only a portion of the number, e.g. digits corresponding to the capital letters may be included. In some implementations, if the user does not permit use of the phone number, abbreviated phone number descriptor format may not be used.<br>In an example, the encoded value can include a sign value computed using the following formula:<br>md5 = MD5(concat(Salt, Abbreviated Phone Number))<br>Hash = lower64 bits(md5) |
| 6 | Person Name (optional) | 16 bytes max | Length and string of person name | Optional. First byte stores the length of the person name followed by the actual person name string.<br>Users can be provided with choice of whether a person name is included. When a user provides consent to use of person name, such names may be included. If the user does not provide consent, person names are not used. |

TABLE 2

Example Private Descriptor Format

| Field No. | Name | Size | Value | Comments |
|---|---|---|---|---|
| 1 | App-ID | 2 bytes | Literal | Identifies that beacon is for peer-to-peer sharing application |
| 2 | Version | 1 byte | Literal 2 | Version identifier |
| 3 | Capabilities | 2 bytes | Combination of capability bits | Bit Definition<br>0 - Supports Bluetooth<br>1 - Supports Wi-Fi (2.4 GHz)<br>2 - Supports Wi-Fi (5 GHz)<br>3 - Supports BLE<br>4 - Supports Audio<br>5 - Supports Wi-Fi Direct |

TABLE 2-continued

Example Private Descriptor Format

| Field No. | Name | Size | Value | Comments |
|---|---|---|---|---|
| | | | | 6 - Supports Wi-Fi Aware |
| | | | | 7 - Supports compression |
| 4 | Salt | 4 bytes | A random number | Random number used in computing sign |
| 5 | Encoded Value (e.g., Hash Value) | 8 bytes | Hash of public key and salt | Public key is from locally generated key pair. In an example, the encoded value can include a hash value computed using the following formula: md5 = MD5(concat(Salt, Public Key)) Hash = lower64 bits(md5) |
| 6 | Person Name (optional) | 16 bytes max | Length and string of person name | Optional. First byte stores the length of the person name followed by the actual person name string. Users can be provided with choice of whether a person name is included. When a user provides consent to use of person name, such names may be included. If the user does not provide consent, person names are not used. |

Salt may be any value that is used as a parameter to an encoding/encryption function to generate an encrypted value. Hash can refer to an encoded value that is produced by encoding the salt, e.g., using a public key or an abbreviated phone number, etc.

Also, include broadening language that byte sizes, bit definitions, fields, etc. of the descriptor formats of Tables 1 and 2 are illustrative, and other formats, longer or smaller sizes, etc. may be used.

In the above descriptor tables, values in the capabilities field represent the communication modes (or modes) and capabilities of the device advertising the descriptor. For example, a device that supports 5 GHz Wi-Fi, can set the appropriate bit, which indicates that it can connect to a Wi-Fi hotspot on a 5 GHz channel. In various implementations, the capabilities field of the descriptor permits two or more user devices to establish a connection using an available technology supported in common by the two or more devices. In some implementations, the available technologies may be ranked, e.g., in an order of preference, and a higher ranked technology may be preferred to lower ranked technology when both are available.

In the abbreviated phone number descriptor (e.g., Table 1), the abbreviated phone number may include, for example, seven of the 10 digits of a typical U.S. phone number, or some similar abbreviated number for other telephone number formats. In the private descriptor (e.g., Table 2), a public key from the key pair is used, e.g., instead of an abbreviated phone number. The public key may satisfy some requirements of cryptographical significance. For example, the public key may be selected, e.g., at random, from a large pool of possible keys.

The abbreviated phone number descriptor (Table 1) may be transmitted when the user is actively using the peer-to-peer application. This feature may be present in some technologies (e.g., Bluetooth beacons), which may advertise beacons when an application is in the foreground. However, the advertisement/scanning may be symmetrical in that advertising and scanning can be done at the same time, so a peer-to-peer application may advertise for "receive mode" with or without requiring explicit user input. As shown in Table 2, the random salt and hash can be used to provide privacy to a user when advertising in private mode.

In some implementations, when a user device (e.g., a sender device) discovers either a private or abbreviated phone number beacon, the sender device can decode the encoded value (e.g., hash) using the salt value along with an abbreviated phone number or public key from the receiver device and match the abbreviated phone number or public key value against a contacts database in the sender device, for example. A match would indicate that the receiver device has been discovered nearby (e.g., within range of the beacon technology being used). In some implementations, it may be possible to match multiple people against the same abbreviated number, the multiple matches can be disambiguated during connection phase, e.g., by using a second authentication/authorization method.

While it may be possible to scan for and receive a beacon signal having a descriptor advertised by another user, determining identity information from the beacon signal may not be possible and/or practical without having a public key or a phone number of a user device advertising the beacon signal. Private descriptors may not be able to be deciphered unless the public key of the user associated with the private descriptor is known.

Sharing between unknown users can be accomplished in a number of ways. In some implementations, a first unknown user may provide contact information (e.g., a phone number) to a second unknown user so that the second unknown user can provision the first unknown user's contact information in the device of the second unknown user (or vice-versa). In some implementations, the descriptors can include a salt value transmitted in plain text in one or both directions. The salt value can be a random value and can include a time-based component. For example, the salt value can include a time the salt value was generated to permit a system to compare a current time to the time the salt value was generated to determine whether the difference is within a threshold time (e.g., do not use the salt value if it was created outside of a given time range from the current time, e.g., more than 1 week prior to the current time). The salt value can be expressed as an alphanumeric string in order to permit a user (e.g., a sender) to match the salt value of surrounding beacon signals to find the corresponding user (e.g., receiver) to establish a peer-to-per connection with.

Returning to FIG. 3, the sending user can select (314) a receiver and the sender device 302 can locate (316) the receiver device 304 during a Bluetooth scan. Once the discovery phase 346 is complete, e.g., at least one of the sender device and the receiver device has discovered the other device, the sender device 302 and receiver device 304 can enter the connection phase 348.

For example, connection can be initiated by the sender device 302 turning on (318) a Wi-Fi hotspot, connecting with the receiver device 304 over Bluetooth (320), selecting one or more files to transfer to the receiver device 304 (322), and sending a connection provisioning message (324) to the receiver device 304 to initiate connection of the receiver device 304 to a Wi-Fi hotspot provided by the sender device 302 (or, alternatively, provided by another system). The connection provisioning message can be sent via Bluetooth and can be encrypted so that sensitive data (e.g., Wi-Fi hotspot password) may be sent securely in the connection provisioning message. The sender device transmitting the connection provisioning message has already discovered the receiver device, the sender device may have received data corresponding to the capabilities supported by the receiver device. In various implementations, the sender device can determine an appropriate method of connection based on the capabilities of the receiver device and the capabilities of the sender device. For example, a typical pair of devices in a first geographic region may choose a 2.4 Ghz Wi-Fi connection based on device capabilities in the first region, where a pair of devices in a second geographic region may select Wi-Fi Direct or Wi-Fi Aware based on device capabilities in the second region. The connection provisioning message can include the SSID of the hotspot and the password for the Wi-Fi hotspot. It will be appreciated that the connection provisioning message can include credentials or other connection specific information for a connection type other than Wi-Fi. The connection provisioning message can be encrypted by the sender device using the public key of the receiver device. This may help ensure that the receiver device contacting the sender device to connect is the correct receiver device. The receiver device having the private key from the key pair corresponding to the public key that the sender device used to encrypt the connection provisioning message can decrypt the connection provisioning message and provide the proper credentials for connecting to the Wi-Fi hotspot.

The receiver device that receives the connection provisioning message knows the device name of the sending device, which can permit the receiver device to extract the subscriber ID from the name. The subscriber ID from the connection provisioning message can be used across other connection provisioning technologies. Upon receipt of the connection provisioning message, the recipient can look up the contact information using the subscriber ID from the connection provisioning message. If a contact is found, the request can be automatically accepted or displayed for manual acceptance/rejection. If the contact is not found, the request can be automatically rejected or displayed for manual acceptance/rejection.

For the above exchange, the Wi-Fi hotspot SSID and password can be randomly generated (e.g., have no specific meaning). The Wi-Fi hotspot SSID and password are communicated to one or more other users (e.g., remote parties or receiving parties) so that the other users can connect to the Wi-Fi hotspot.

TABLE 3

Example Connection Provisioning Message Format

| Field | Name | Type | Description |
|---|---|---|---|
| 1 | From | String | Abbreviated phone number (or salt) as described in beacon information |
| 2 | EncryptMethod | Enum | Encryption method identifier, e.g., {EncryptedWithPhoneNum, EncryptedWithPublicKey} |
| 3 | ConnectionInfo | Struct | Connection information is encrypted with either public key of the target device (e.g., the sender device or receiver device, depending on scenario) or with the full phone number of the target device |
| 3.1 | ConnectionId | int | A random value that uniquely identifies connection on sender device |
| 3.2 | Connect Method | Enum | Method to use for connection, e.g., {WiFi, WiFi Direct, WiFi Aware, Bluetooth} |
| 3.3 | Connection Info | Varies | Depends upon method selection<br>Wi-Fi - SSID, Password, Internet Protocol (IP) address and port<br>Wi-Fi Direct - Group name, IP address and port<br>Wi-Fi Aware - Cluster ID, IP address and port<br>Bluetooth |
| 3.4 | AuthInfo | Certificate | Sender's certificate describing the sender device's public key. Can be useful when using hotspot hosted by third party. |
| 3.5 | Message Info | Varies | Link or message |

Processing continues by the sender device 302 starting a server (326). The receiver device 304 performs a scan for a Wi-Fi hotspot 328 and finds the hotspot 330 indicated by the sender device 302 in the connection provisioning message. The receiver device 304 connects to the Wi-Fi hotspot of the sender device 302 (332) using the SSID and password provided by the sender device in the connection provisioning message and, in turn, connects to the server provided by the sender device 302 (334).

It will be appreciated that other connection provisioning models may be used. For example, BLE may be used to send a connection provisioning message (e.g., using the generic attribute (GATT) profile). BLE provides a relatively low bandwidth (e.g., 14 Kbps) and the data a may not be encrypted, but the connection provisioning (or connection provisioning) message may be small enough to be sent within about a half a second, which would make it feasible to use BLE for the connection provisioning message.

A cloud messaging notification system may be used to deliver the connection provisioning message via a cloud service over cellular or Wi-Fi. Audio can also be used to send a connection provisioning message. Wi-Fi Aware can also be used for connection provisioning messages. Connection provisioning messages sent over Wi-Fi Aware may not be encrypted, but may be sent with high bandwidth interaction.

The sender device 302 acknowledges the server connection by the receiver device 304 by sending an acknowledgement message (or ACK) and providing a list of one or more files for the receiver device 304 to download (336). The files can include an image, text, a video file, an audio file, or other data. In general, any type of data can be shared via the peer-to-peer methods described herein. The peer-to-peer process now enters the transfer phase 350.

In the transfer phase 350, the one or more files provided in the list by the sender device 302 to the receiver device 304 are transferred (338) from the sender device 302 to the receiver device 304 via the server connection. The receiver device 304 provides a done signal (340) when it has received all of the files and the receiver device 304 disconnects from the server and/or hotspot (342). Alternatively, the receiver device 304 could remain connected to the server and/or Wi-Fi hotspot after the transfer is complete in order to facilitate another transfer. The sender device 302 can turn off the Wi-Fi hotspot (344) once the receiver has disconnected or in response to some other signal such as input from the user of the sender device, or automatically once the file transfer has completed, etc.

Figure 4:
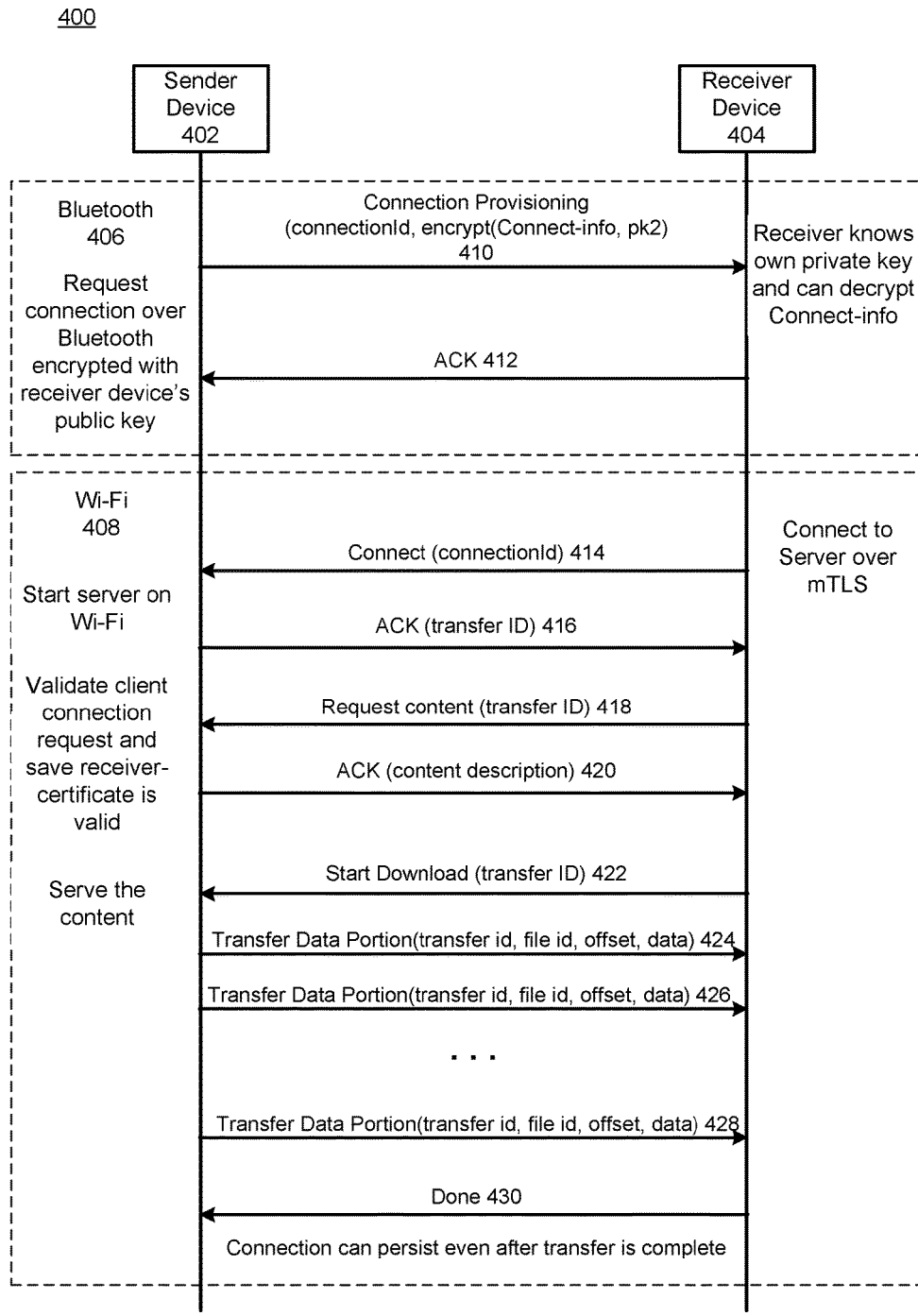
FIG. 4 is a flow diagram illustrating an example method to perform peer-to-peer connection and transfer between known contacts, according to some implementations.

FIG. 4 is a flow diagram illustrating an example method to perform peer-to-peer connection and data transfer between known contacts, according to some implementations. In particular, in a Bluetooth portion of the connection (406), a sender device 402 can transmit a connection provisioning message (410) to the receiver device 404 using Bluetooth (or another communication technology). The connection provisioning message can include a ConnectionId (e.g., Field 3.1 described in Table 3 above) and an encrypted value based on Connection Info (e.g., Field 3.3 described in Table 3 above) and pk2 (e.g., receiver's public key).

The receiver device 404 can decrypt the encrypted value including the Connection Info using the receiver's private key from the key pair. If the receiver device 404 is able to decrypt the connection provisioning message, then the receiver device 404 responds with an acknowledgement message (412).

The data transfer can take place in a Wi-Fi portion of the process 408. In the Wi-Fi portion 408, the sender device can start a Wi-Fi server. The receiver device 404 can send a connection request message, including the Connection Id, to the sender device 402 (414) requesting to connect to the server provided by the sender device 402 via mutual TLS (mTLS) or other suitable protocol.

After validating the receiver (or client) connection request based on the certificate provided by the receiver device 404, the sender device 402 can respond with an acknowledgement message (e.g., connection request grant message) that contains a transfer ID value (416). The receiver device 404 can send a content request message that includes the transfer ID (418). The sender device 402 can acknowledge the content request message with an acknowledgement message (e.g., a content request grant message) that includes a description of the download data content (e.g., number of files, file types, file names, file sizes, etc.) (420). If the peer-to-peer connection is a first connection, the sender device can include its public key in the connection info and discover the receiver's public key during the mTLS handshake.

The receiver device 404 can send a download start message including the transfer ID in the message (422). The sender device 402 can send one or more messages transferring a data portion (e.g., a "chunk") to the receiver device 404 (e.g., 424-428). Once the content has been transferred to the receiver device 404, the receiver device 404 can send a transfer complete message to the sender device 402 (430). The connection (e.g., the Wi-Fi connection and/or the Bluetooth connection) between the sender device 402 and the receiver device 404 can persist after the transfer is complete.

Figure 5:
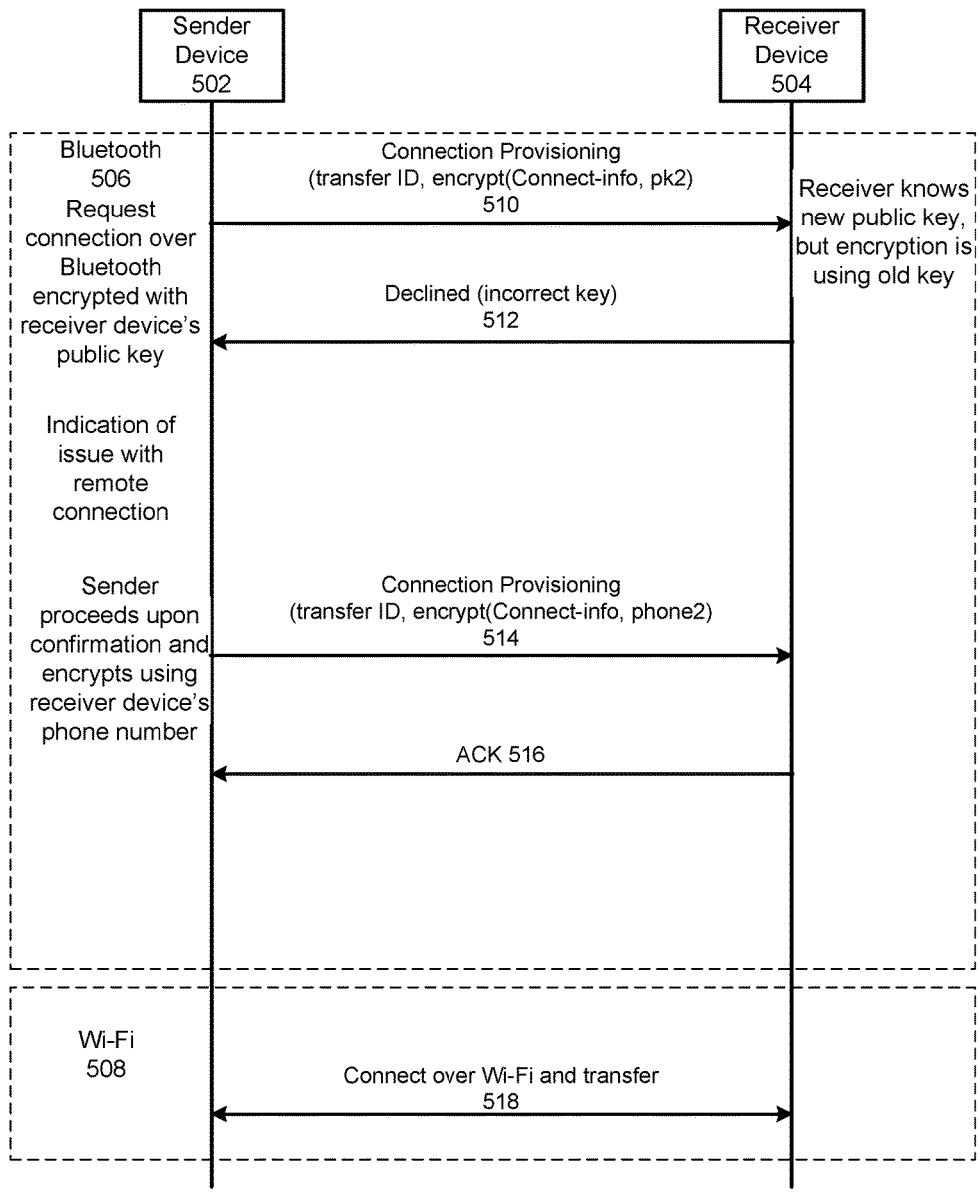
FIG. 5 is a flow diagram illustrating an example method to perform peer-to-peer connection and transfer between known contacts having expired keys, according to some implementations.

The keys used to validate peer-to-peer connection may expire due to time lapse or to a manual or automatic expiration. Immediate expiration can be used to invalidate a key such that a user can disable the ability of another user to connect to the user using the expired key. Keys may also expire when a user changes devices and/or uninstalls an application. In cases where a key has expired, the key may be updated. FIG. 5 is a flow diagram illustrating an example method 500 to perform peer-to-peer connection and transfer between known contacts having one or more expired keys, according to some implementations. In particular, a sender 502 may transmit a connection request (or initiation) message over Bluetooth (510) during a Bluetooth portion of the connection 506, where the connection provisioning message includes a transfer ID and includes an encrypted value based on Connection Info and pk2, which is an expired public key of a receiver device 504. The receiver device 504 has a new key pair (e.g., an unexpired key pair) which is different from the key pair that the expired public key was from. When attempting to decrypt the connection provisioning message, the receiver device 504 may use a new private key from the new key pair to attempt to decrypt the message and the decryption will not work. The receiver device 504 then responds to the sender device 502 with a connection declined message and indicates the reason as an incorrect key value (512).

The sender device 502 may generate an indication of an issue with the connection provisioning message. Upon determining that there was a problem with the key, the sender device 502 can send a second connection provisioning message that includes the transfer ID and an encrypted value based on the Connection Info and the phone number associated with the receiver device 504 (514). The receiver device 504 can decrypt the encrypted value using the phone number associated with the receiver device 504. Once the connection provisioning message has been decrypted using the receiver phone number, the receiver can send an acknowledgement to the sender device 502 (516) and a connection and transfer over Wi-Fi (518) can occur during a Wi-Fi portion 508 of the peer-to-peer sharing. The sender's public key can be included in Connection Info and the receiver's public key can be determined during the mTLS handshake.

Figure 6:
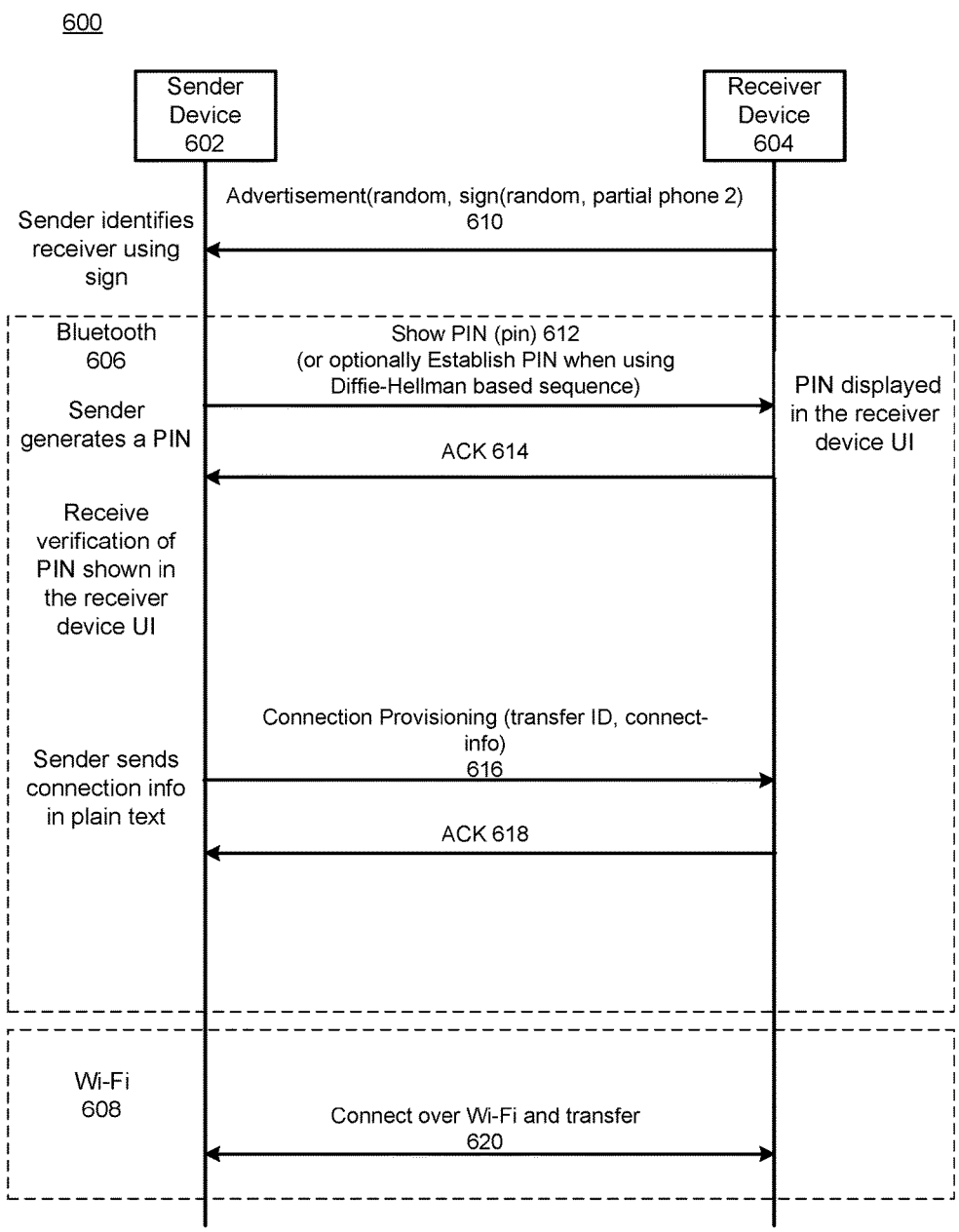
FIG. 6 is a flow diagram illustrating an example method to perform peer-to-peer connection and transfer, according to some implementations.

Because it may be possible for a malicious user to hack phone numbers and pose as a legitimate user, some implementations of the peer-to-peer sharing application can include a high security mode. In the high security mode, the peer-to-peer application can request that a user verify that another user is the other user that a peer-to-peer connection is to be formed with. This verification can be accomplished using a Personal Identification Number (PIN) as shown in FIG. 6, which is a flow diagram illustrating an example method 600 to perform peer-to-peer connection and transfer where a sender device seeks high security, according to some implementations. In particular, a sender device 602 receives an advertisement message from a receiver device (610). The advertisement message can contain a random value and a hash value of the random value and a partial phone number. The sender device 602 can identify the receiver device 604 using the hash value.

The sender device 602 generates a PIN and provides a message to the receiver to display the PIN (612). The receiver device 604 acknowledges the PIN display message (614) and causes the PIN to be displayed in a user interface shown on a display associated with the receiver device 604. A user of the sender device 602 device can verify the PIN. Once the PIN has been verified, the sender device 602 sends a connection provisioning message in plain text to the receiver device 604 (616). The connection provisioning message can include the transfer ID and the Connection Info. The receiver can respond to the plain text connection provisioning message via an acknowledgement (618). The connection and data transfer (620) can proceed as described above in a Wi-Fi portion 608 of the peer-to-peer sharing. The PIN exchange/verification process can be based on a Diffie-Hellman based authenticated key exchange protocol, which may not rely on the secret of private keys, but may instead rely on a human (e.g., the device owner) to perform a Diffie-Hellman based authenticated key exchange. At the end of a key exchange sequence, a client and server have a shared master secret that can be used to derive keys, and a next protocol that they expect to use those derived keys with. The key exchange protocol may only implicitly guarantees that servers know that clients believe the protocol finished correctly. That is, until a server receives a message on the next protocol from the client it may not know that the handshake completed. This type of key exchange protocol can be used to establish a secure channel between two user devices. The secure channel then can be used to transmit passwords or other credentials. This technique can be especially useful when one wants to connect a brand new device to a password-protected Wi-Fi network, as may be the case during a peer-to-peer exchange as described herein.

Figure 7:
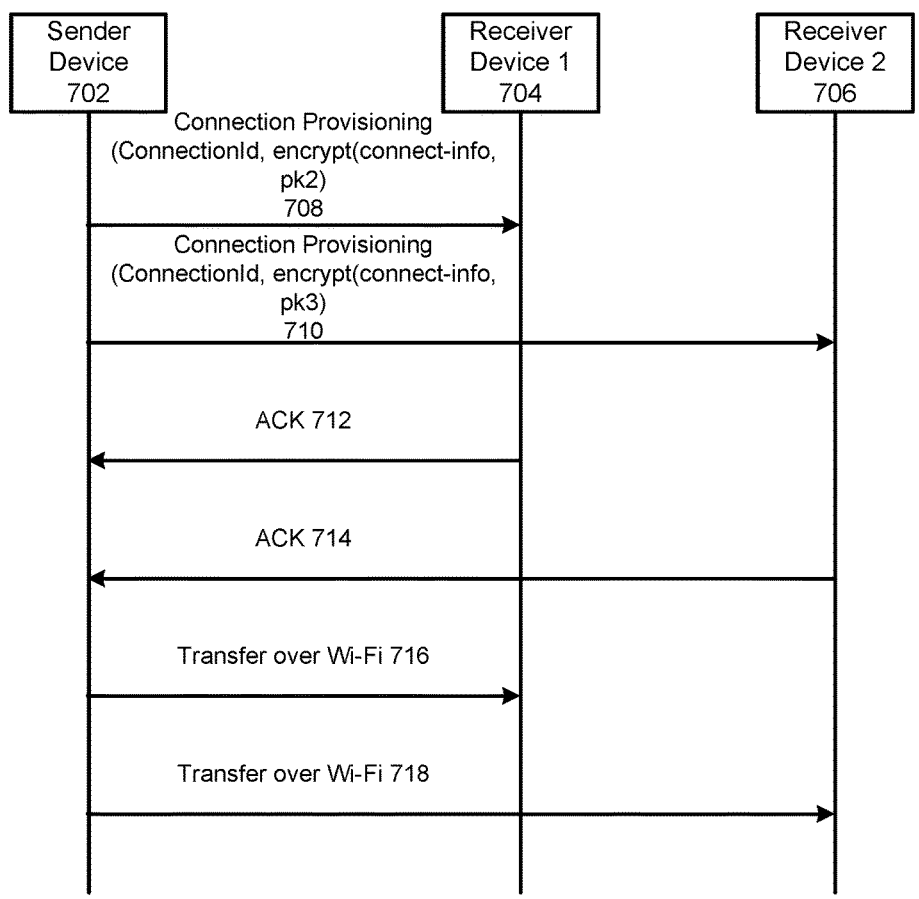
FIG. 7 is a flow diagram illustrating an example method to perform peer-to-peer connection and transfer from a sender device to multiple known receiver devices, according to some implementations.

It will be appreciated that while single sender device to single receiver device scenarios are described herein for illustration purposes, other peer-to-peer transfer configurations can be implemented such as single sender device to multiple receiver devices as shown in FIG. 7, which is a flow diagram illustrating an example method to perform peer-to-peer connection and transfer from one sender device 702 to multiple known receivers 704, 706, according to some implementations. The sender device 702 may send a respective connection provisioning messages (708, 710) to the receiver device 704 and receiver 706. Receiver 704 may respond with an acknowledgment (712) and receiver 706 may respond with an acknowledgement (714). The sender device 702 may then transfer data over a Wi-Fi connection (as described herein) to receiver device 704 and receiver 706, (716) and (718) respectively.

Figure 8:
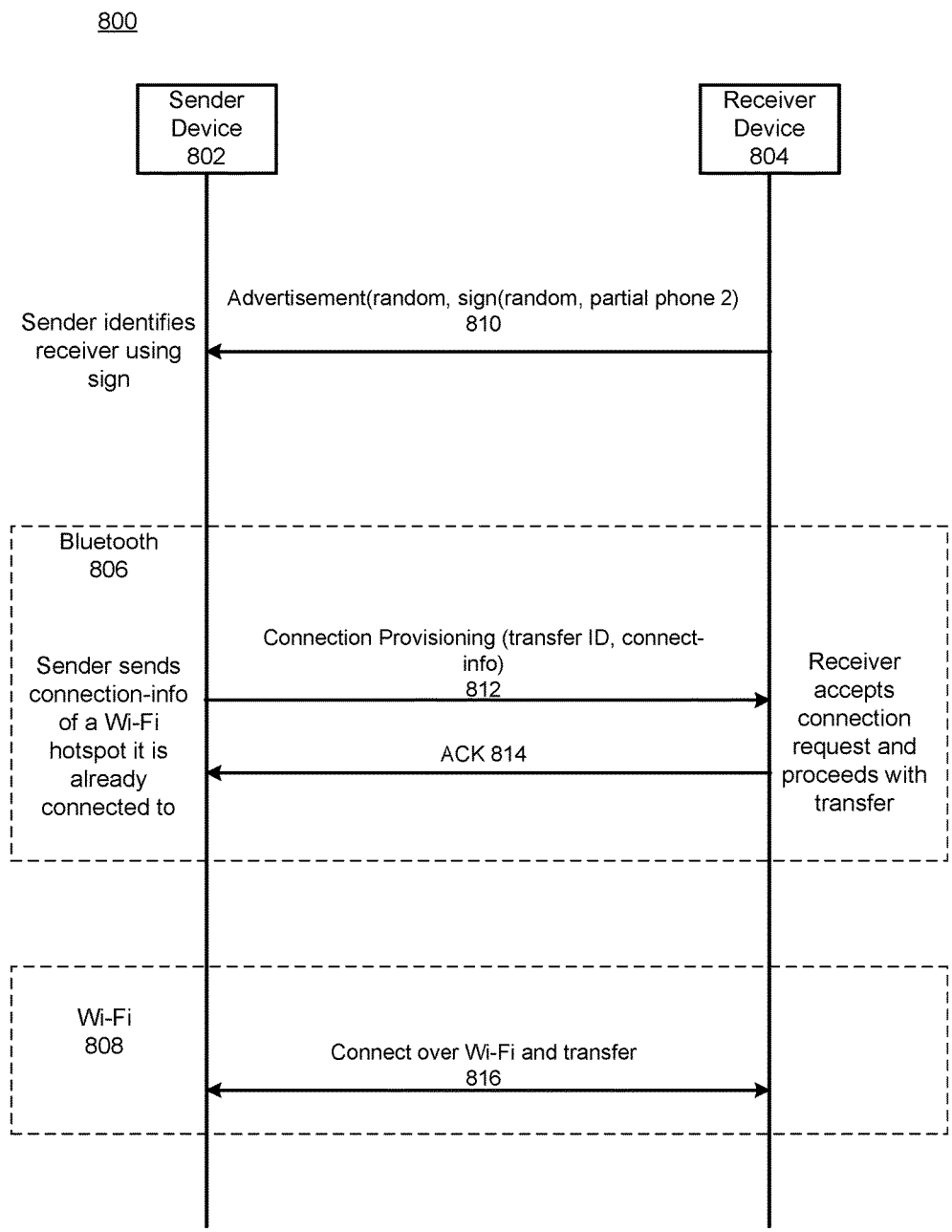
FIG. 8 is a flow diagram illustrating an example method to perform peer-to-peer connection and transfer where a sender device utilizes a Wi-Fi hotspot provided by another device, according to some implementations.

FIG. 8 is a flow diagram illustrating an example method 800 to perform peer-to-peer connection and transfer where a sender device utilizes a Wi-Fi hotspot provided by another system, according to some implementations. In particular, a sender device 802 receives an advertisement message (810) from a receiver device 804. The advertisement message can include a random value (e.g., salt) and a hash value based on the random value and a partial phone number associated with the receiver.

The sender device 802 can send a connection provisioning message to the receiver device 804 (812). The connection provisioning message can include connection information for a Wi-Fi hotspot the sender device 802 is already connected to. The receiver can accept the connection request, respond with an ACK (814) and proceed with the Wi-Fi connection and transfer (816) in a Wi-Fi phase 808.

Figure 9:
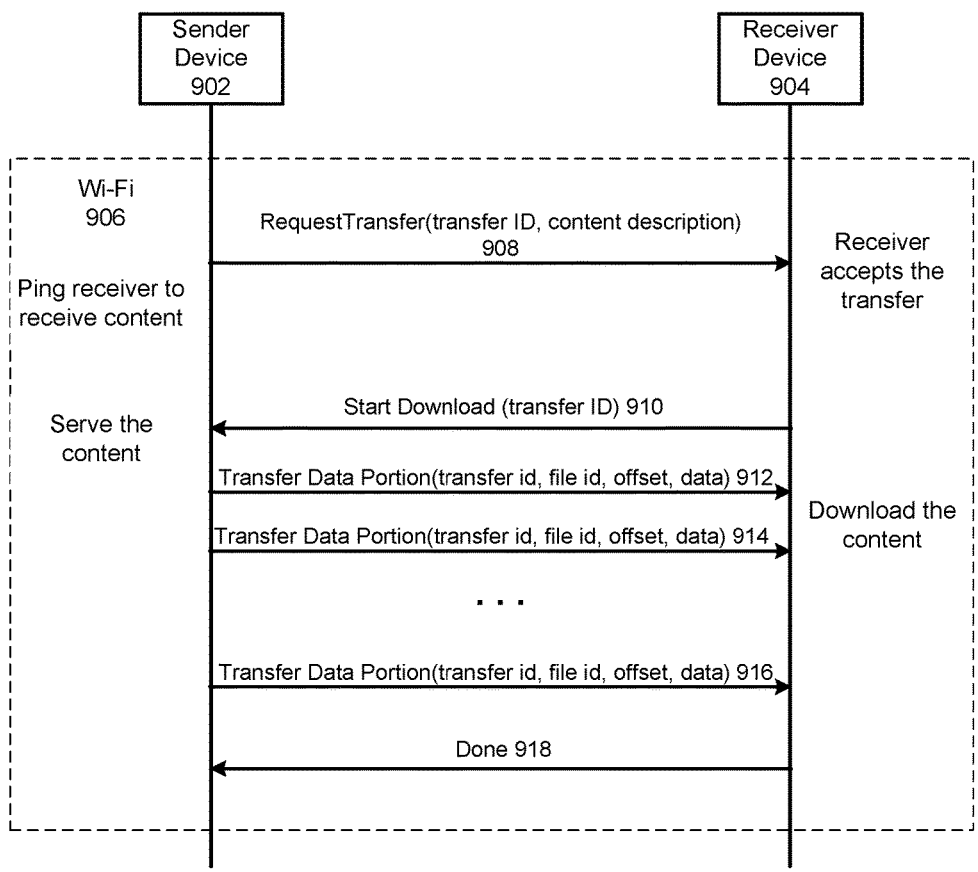
FIG. 9 is a flow diagram illustrating an example method to perform peer-to-peer connection and transfer where a sender device utilizes a Wi-Fi connection that was in place prior to the peer-to-peer connection, according to some implementations.

FIG. 9 is a flow diagram illustrating an example method 900 to perform peer-to-peer connection and transfer where a sender device utilizes a Wi-Fi connection between the peer devices that was in already place, according to some implementations. A Wi-Fi connection between two or more devices may persist and be used for a subsequent data transfer operation. FIG. 9 illustrates this scenario where a sender 902 has a Wi-Fi connection already in place with a receiver device 904. In order to make a peer-to-peer data transfer, the sender device 902 pings the receiver device 904 with a transfer request message (908) that includes a transfer ID and content description. The receiver device 904 can accept the transfer and respond with a start download message (910) that includes the transfer ID.

The sender device 902 can send one or more data transfer message that contain a portion of the data along with a transfer ID, file ID and offset into the file for the portion of data contained in the message. When the data transfer is complete, the receiver device 904 can send a transfer done message to the sender device 902 (918).

Figure 10:
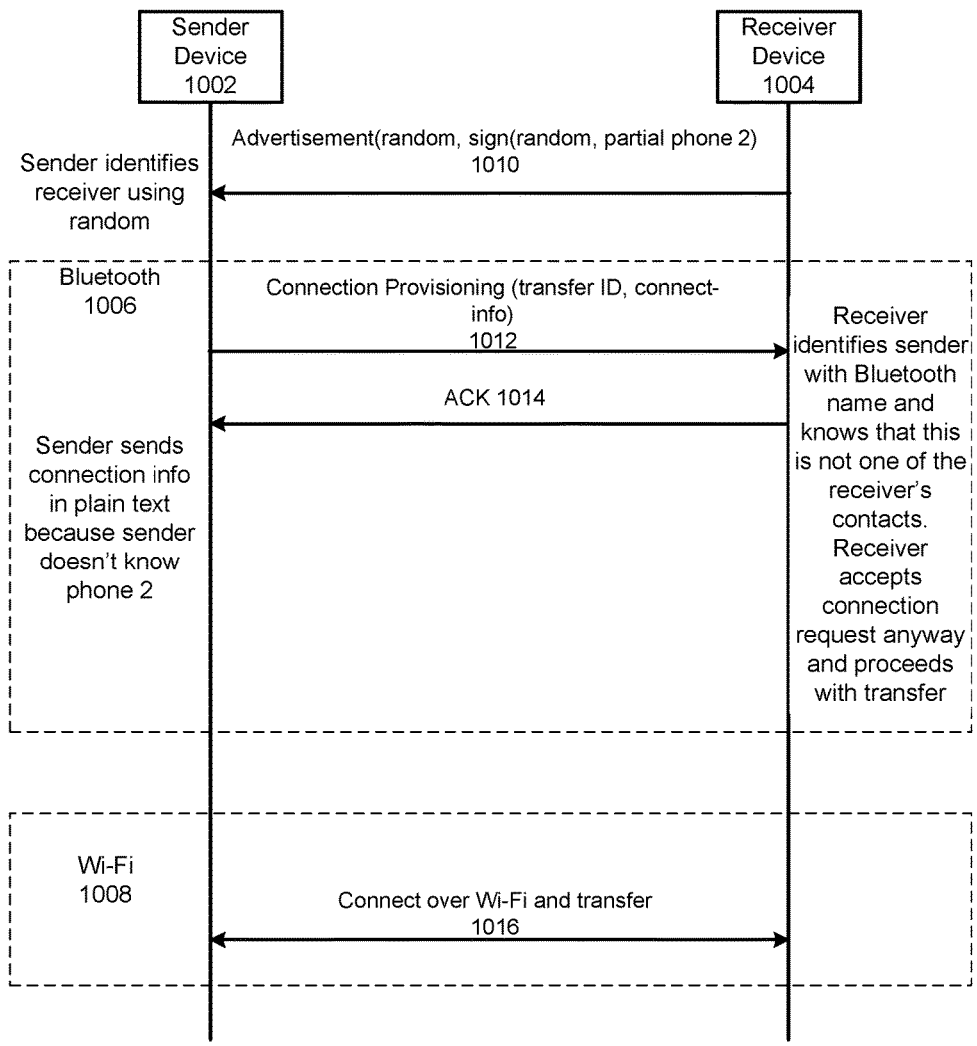
FIG. 10 is a flow diagram illustrating an example method to perform peer-to-peer connection and transfer from a sender device to an unknown receiver device, according to some implementations.

In some instances, a sender device may transfer to an unknown receiver device as shown in FIG. 10, which is a flow diagram illustrating an example method 1000 to perform a peer-to-peer connection and transfer from a sender device 1002 to an unknown receiver device 1004, according to some implementations. The sender device 1002 may receive an advertisement message sent from the receiver device 1004 (1010). The advertisement message may include a random value and a value representing a result of a hash of the random value and a partial phone number associated with the receiver device 1004. The sender device 1002 may identify the receiver device 1004 using the random value.

Once the sender device 1002 has identified the receiver device 1004, the sender device 1002 can send a connection provisioning message (1012) to the receiver device 1004 via a Bluetooth connection 1006, where the connection provisioning message includes a transfer ID and Connection Info. The receiver device 1004 can identify the sender device 1002 using the Bluetooth name and determine the sender device 1002 is not one of the receiver's contacts. The receiver can acknowledge the connection provisioning message (1014), accept the connection request and proceed with the transfer (1016) in a Wi-Fi portion 1008 of the process.

Figure 11:
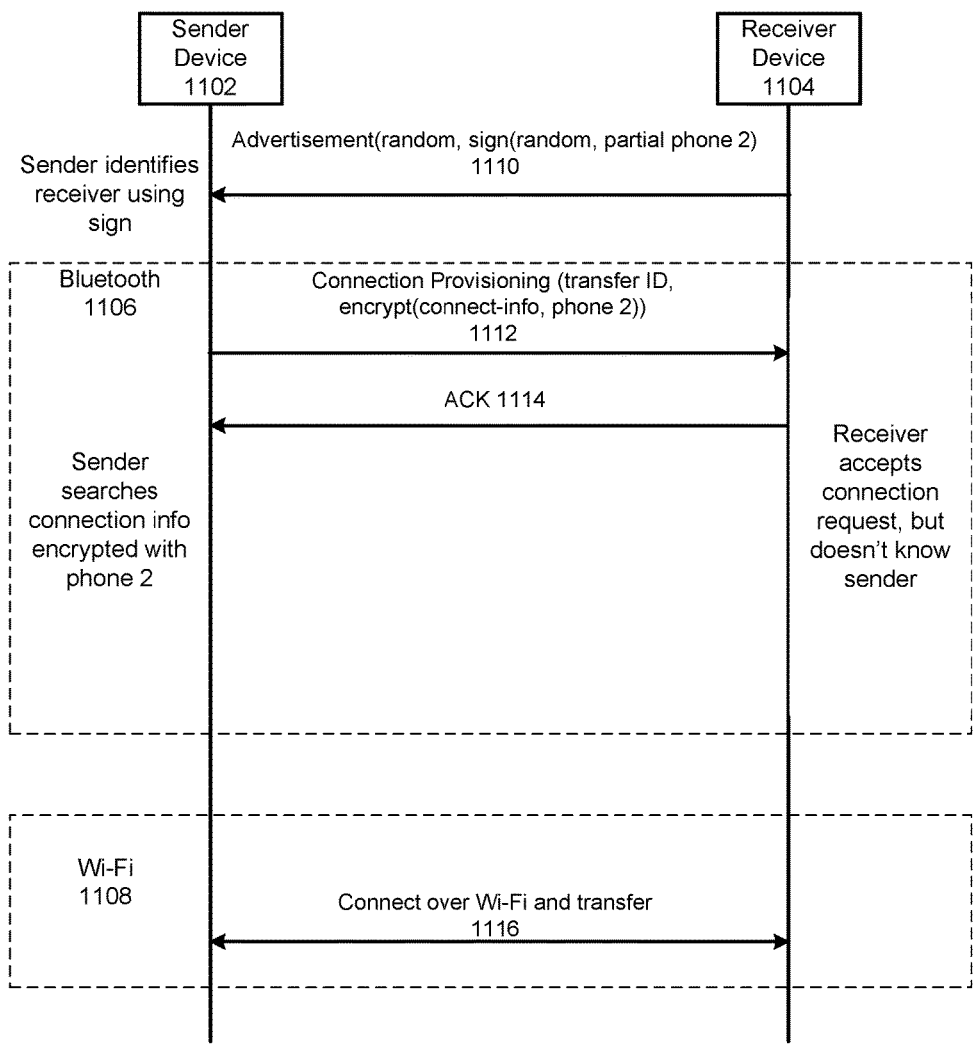
FIG. 11 is a flow diagram illustrating an example method to perform peer-to-peer connection and transfer from an unknown sender device to a receiver device, according to some implementations.

In some instances, a receiver device may not know the sender device as shown in FIG. 11, which is a flow diagram illustrating an example method 1100 to perform peer-to-peer connection and transfer from an unknown sender 1102 to a receiver device 1104, according to some implementations. The sender device 1102 may receive an advertisement message sent from the receiver device 1104 (1110). The advertisement message may include a random value and a value representing a result of a hash of the random value and a partial phone number associated with the receiver device 1104. The sender device 1102 may identify the receiver device 1104 using the hash by searching the contacts in a contact data base of the sender device 1102. The contacts may be searched in the order stored, or may be searched in other orders such as newest added first or based on another criteria such as proximity of a location associated with the contacts relative to a current location of the sender device 1102.

The sender device 1102 can send a connection provisioning message (1112) to the receiver device 1104 via a Bluetooth connection 1106, where the connection provisioning message includes a transfer ID and Connection Info encrypted using a complete phone number associated with the receiver device 1104 that the sender device 1102 located in the sender device contact database based on decrypting the advertisement message hash. The receiver device 1104 can decrypt the Connection Info using the receiver's phone number and accept the connection, but does not know the sender device 1102. The receiver can acknowledge the connection provisioning message (1114), accept the connection request and proceed with the transfer (1116) in a Wi-Fi portion 1108 of the process.

Figure 12:
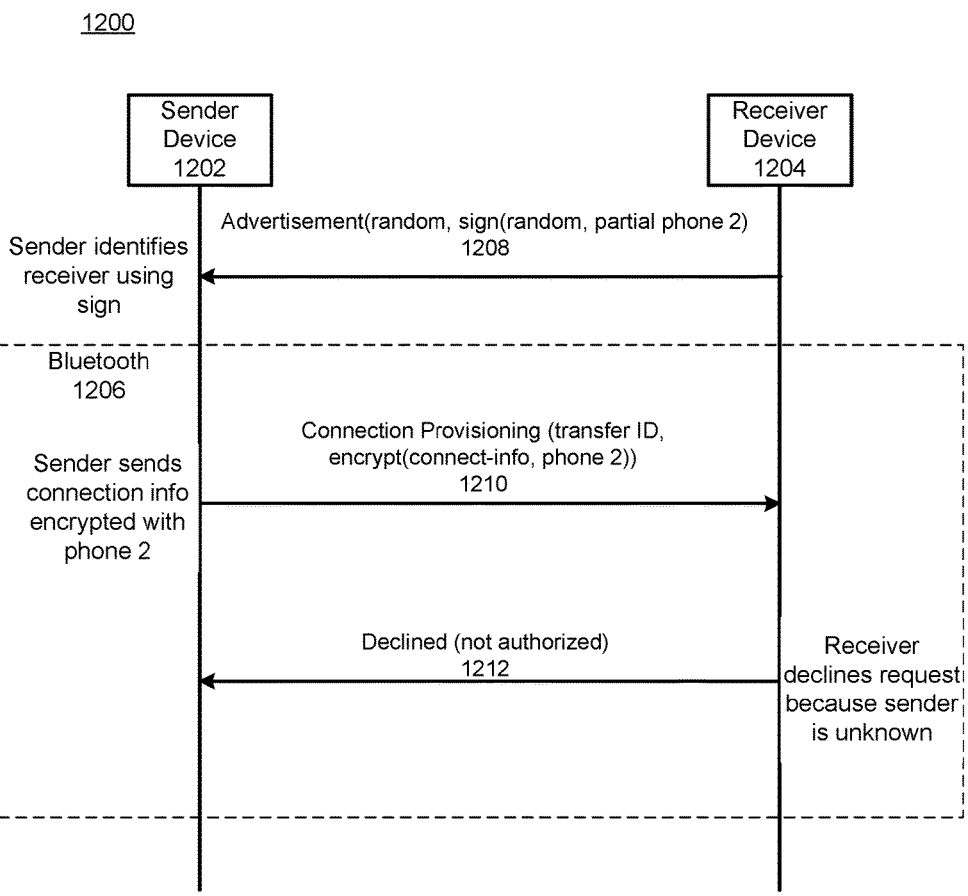
FIG. 12 is a flow diagram illustrating an example method to perform peer-to-peer connection where the sender device is unknown to the receiver device, according to some implementations.

In some instances, a user may wish to operate with an increased level of security. For example, at a medium level of security, when a receiver device doesn't know a sender device, a connection provisioning message from the sender device may be declined by the receiver device as shown in FIG. 12, which is a flow diagram illustrating an example method 1200 to perform peer-to-peer connection with medium security where the sender device 1202 is unknown to the receiver device 1204, according to some implementations. The sender device 1202 may receive an advertisement message sent from the receiver device 1204 (1208). The advertisement message may include a random value and a value representing a result of a hash of the random value and a partial phone number associated with the receiver device 1204. The sender device 1202 may identify the receiver device 1204 using the hash by searching the contacts in a contact data base of the sender device 1202. The contacts may be searched in the order stored, or may be searched in other orders such as newest added first or based on another criteria such as proximity of a location associated with the contacts relative to a current location of the sender device 1202.

The sender device 1202 can send a connection provisioning message (1212) to the receiver device 1204 via a Bluetooth connection 1206, where the connection provisioning message includes a transfer ID and Connection Info encrypted using a complete phone number associated with the receiver device 1204 that the sender device 1202 located in the contact database of the sender based on decrypting the advertisement message hash. The receiver device 1204 can decrypt the Connection Info using the receiver's phone number and decline the connection because the receiver device 1204 does not know the sender device 1202. The receiver device 1204 can send a decline message (1214), where the decline message indicates that a connection with the receiver is not authorized.

Figure 13:
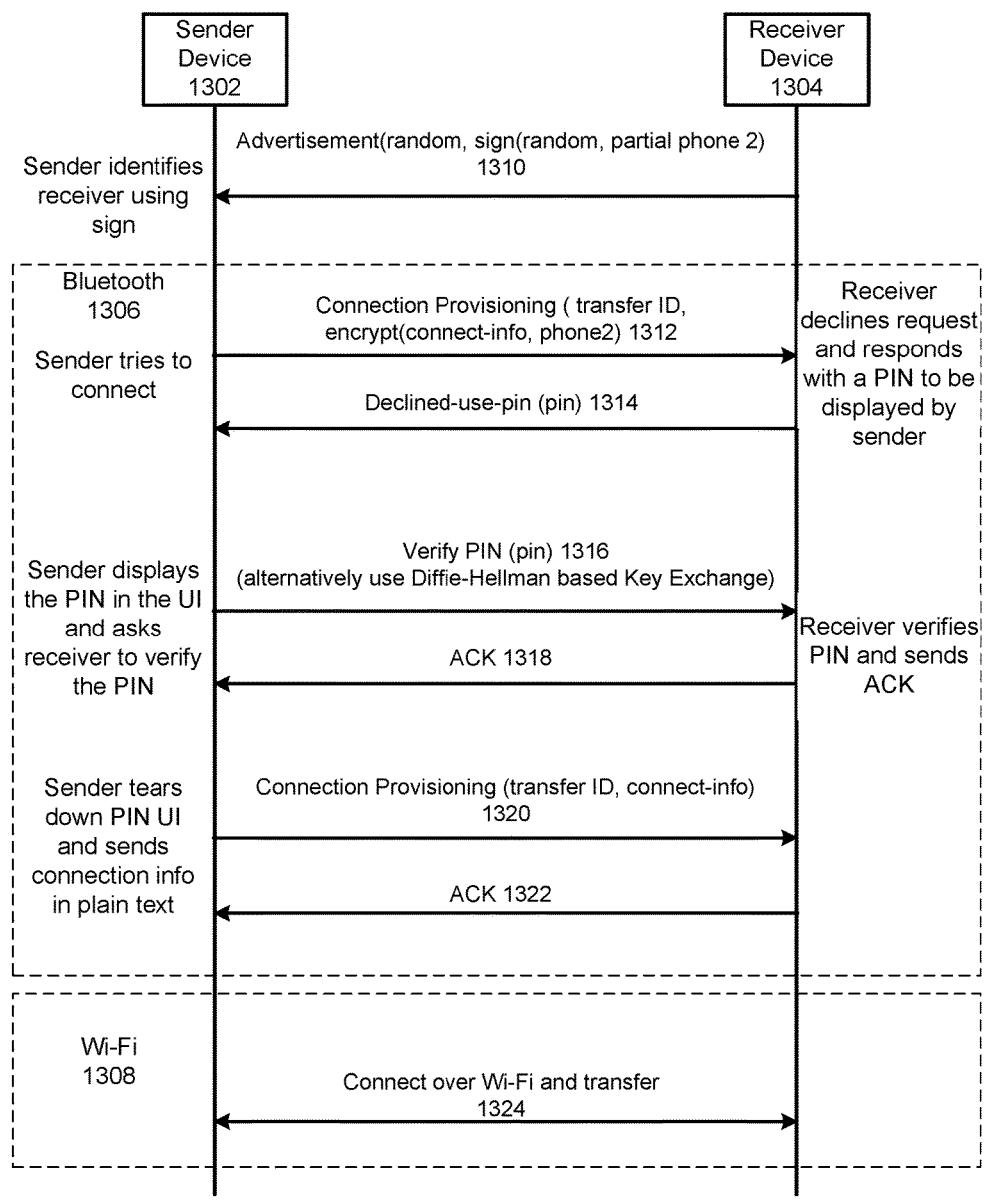
FIG. 13 is a flow diagram illustrating an example method to perform peer-to-peer connection where the sender device is unknown to the receiver, according to some implementations.

In some instances a sender device and/or a receiver device may request a high security peer-to-peer transfer technique. For example, a receiver device may want a high security peer-to-peer transfer as shown in FIG. 13, which is a flow diagram illustrating an example method 1300 to perform peer-to-peer connection with high security where the sender device 1302 is unknown to the receiver device 1304, according to some implementations. The sender device 1302 may receive an advertisement message sent from the receiver device 1304 (1310). The advertisement message may include a random value and a value representing a result of a hash of the random value and a partial phone number associated with the receiver device 1304. The sender device 1302 may identify the receiver device 1304 using the hash by searching the contacts in a contact data base of the sender device 1302 and attempting to decrypt the hash using phone numbers from the contact data base of the sender device 1302. The contacts may be searched in the order stored, or may be searched in other orders such as newest added first or based on another criteria such as proximity of a location associated with the contacts relative to a current location of the sender device 1302.

The sender device 1302 can send a connection provisioning message (1312) to the receiver device 1304 via a Bluetooth connection 1306, where the connection provisioning message includes a transfer ID and Connection Info encrypted using a complete phone number associated with the receiver device 1304 that the sender device 1302 located in the sender contact database based on successfully decrypting the advertisement message hash. The receiver device 1304 can decrypt the Connection Info using the receiver's phone number, but declines the connection request and responds with a request for the sender device 1302 to display a PIN number sent from the receiver device 1304 to the sender device 1302. The sender device can then send a PIN verify message to the receiver (1316) requesting the receiver device to verify the PIN displayed on the sender device 1302. Once the ACK for PIN verification (1318) has been received at the send from the receiver device, the sender device can send a connection provisioning message to the receiver device 1304 (1320), where the transfer ID and the Connection Info can be sent in plain text. The receiver device 1304 can acknowledge the connection provisioning message (1320), accept the connection request and proceed with the transfer (1324) in a Wi-Fi portion 1308 of the process.

Figure 14:
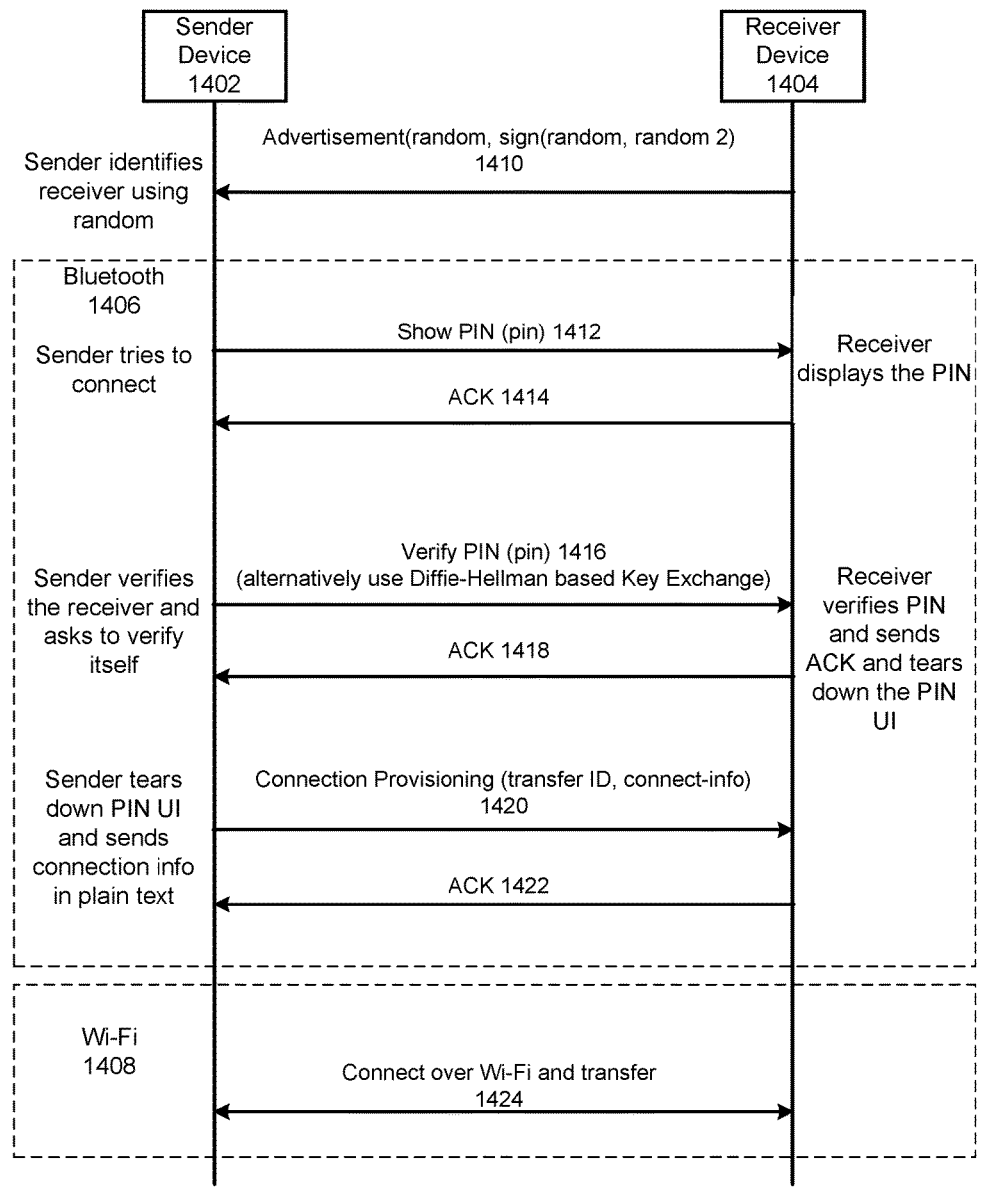
FIG. 14 is a flow diagram illustrating an example method to perform peer-to-peer connection where the sender device and the receiver device are unknown to each other, according to some implementations.

FIG. 14 is a flow diagram illustrating an example method 1400 to perform peer-to-peer connection with high security where the sender device 1402 and the receiver device 1404 are anonymous, according to some implementations. The sender device 1402 may receive an advertisement message sent from the receiver device 1404 (1410). The advertisement message may include a first random value and a value representing a result of a hash of the random value and a second random value. The sender device 1402 may identify the receiver device 1404 using the first random value.

The sender device 1402 can send a show PIN message (1412) to the receiver device 1404 via a Bluetooth connection 1406. The receiver device 1404 can show the PIN displayed on a display device of the receiver device 1404. The receiver device can send an ACK to the sender device (1414). The sender device can verify the PIN displayed on the receiver device 1404 and ask for the receiver device 1404 to verify the sender device 1402 by sending the receiver device a verify PIN message 1416. The receiver device can then verify the PIN shown on a display device of the sender device 1402 and send an ACK to the sender (1418). The sender device can send a connection provisioning message to the receiver device 1404 (1420), where the transfer ID and the Connection Info can be sent in plain text. The receiver device 1404 can acknowledge the connection provisioning message (1420), accept the connection request and proceed with the transfer (1424) in a Wi-Fi portion 1408 of the process.

Described features can provide privacy-preserving and secure peer-to-peer discovery, connection and data transfer. Described features can permit a first user device to discover other nearby devices that are either known to a first user or which are unknown but capable of peer-to-peer data transfer, and following discovery, described features can permit two or more users to establish a peer-to-peer connection in order to transfer data. Further, described features allow a user to determine whether to operate in a private mode or in a more visible mode and to operate at an increased security level.

The techniques permit formation of peer-to-peer connections while preserving user privacy and providing various levels of security. Consequently, a technical effect of one or more described implementations is that peer-to-peer connections between two or more devices are achieved with improved privacy protection and security features. For example, a technical effect of described features is a peer-to-peer data transfer process that includes greater privacy protection in a discovery phase and greater security in a connection phase than in a system that does not provide one or more of the described features.

One or more implementations described herein relate to a peer-to-peer discovery, connection and data transfer method that can provide privacy protection and increased security. In general, some implementations may provide a peer-to-peer data sharing service that can operate offline (e.g., not connected to a network) in a device-to-device mode. As mentioned above, there may be privacy and security concerns when engaging in peer-to-peer data sharing with unknown users and even with known users due to advertising and scanning that may be done in order to permit devices to discover other devices capable of forming peer-to-peer connections.

Some implementations may provide a first advertising mode that can include an abbreviated user identifier (e.g., an abbreviated phone number of a user) and a second advertising mode that is "privacy friendly" (e.g., more private than the first mode) and does not include advertising an abbreviated identifier and instead, may use a random value or other value as an identifier. Further, some implementations may provide a foreground discovery mode that is active when a peer-to-peer sharing application has focus on a device, and a background discovery mode that operates in the background when the peer-to-peer sharing application does not have focus on the user device. In some implementations, the background discovery mode may use the privacy friendly advertising mode.

One or more systems and methods discussed herein do not require collection or usage of user personal information. In situations in which certain implementations discussed herein may collect or use personal information about users (e.g., a partial or complete user phone number, user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. A user for which personal information is to be collected may be presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined (e.g., a partial phone number may be used as an encryption key or an identification value). As another example, a user's geographic location may be generalized to a larger region so that the user's particular location cannot be determined.

Figure 15:
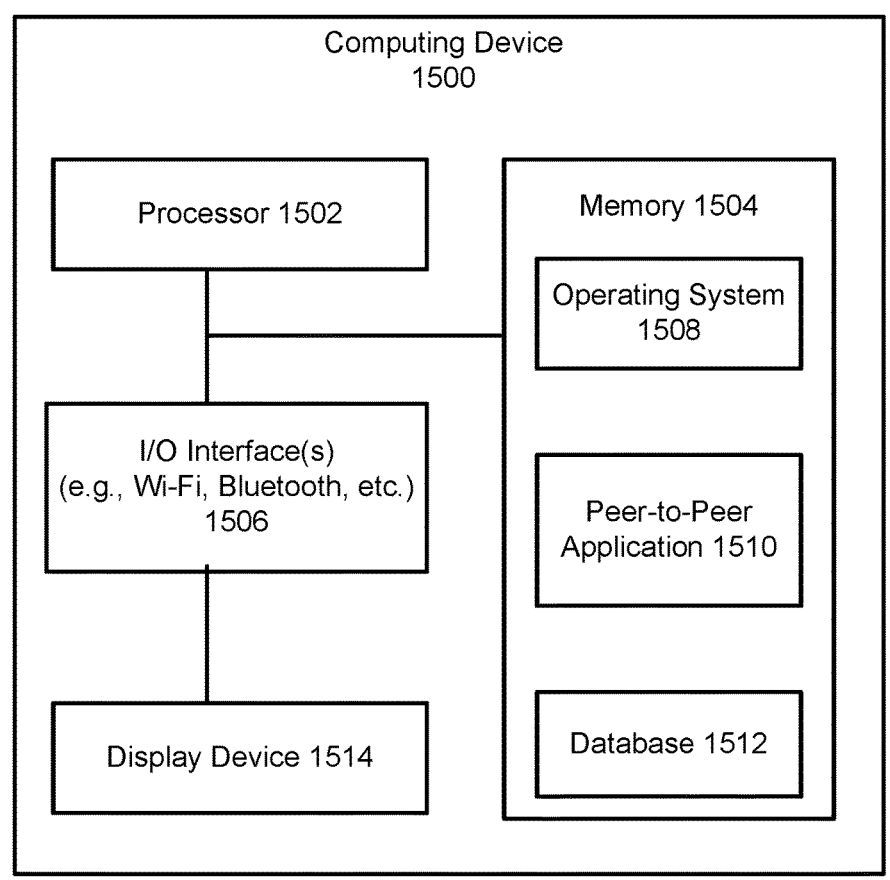
FIG. 15 is a block diagram of an example computing device which may be used for one or more implementations described herein.

FIG. 15 is a block diagram of an example computing device 1500 which may be used to implement one or more features described herein. In one example, computing device 1500 may be used to implement a user device, e.g., any of user devices 102-106 shown in FIG. 1. Computing device 1500 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, computing device 1500 includes a processor 1502, a memory 1504, and input/output (I/O) interface 1506. Processor 1502 can be one or more processors and/or processing circuits to execute program code and control basic operations of the computing device 1500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1504 is typically provided in computing device 1500 for access by the processor 1502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1502 and/or integrated therewith. Memory 1504 can store software operating on the computing device 1500 by the processor 1502, including an operating system 1508 and one or more applications 1510 such as a peer-to-peer discovery, connection and data transfer application, etc. In some implementations, the applications 1510 can include instructions that enable processor 1502 to perform functions described herein, e.g., one or more of the methods of FIGS. 3-15. For example, applications 1510 can include one or more panoramic image montage display and editing applications 1512, including a program to receive, display, and enable updating of panoramic image montages, and store related data as described herein. One or more of the applications can, for example, provide a displayed user interface responsive to user input to display selectable options or controls, and data based on selected options. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 1504 can alternatively be stored on any other suitable storage location or computer-readable medium. In addition, memory 1504 (and/or other connected storage device(s)) can store panoramic image montages, component image portions and related data structures, parameters, audio data, user preferences, and/or other instructions and data used in the features described herein. Memory 1504 and any other type of storage (magnetic disk, optical disk, magnetic tape, or other tangible media) can be considered "storage" or "storage devices."

The I/O interface 1506 can provide functions to enable interfacing the computing device 1500 with other systems and devices. Interfaced devices can be included as part of the computing device 1500 or can be separate and communicate with the computing device 1500. For example, network communication devices, wireless communication devices, storage devices, and input/output devices can communicate via the I/O interface 1506. In some implementations, the I/O interface 1506 can connect to interface devices such as input devices (keyboard, pointing device, touch screen, microphone, camera, scanner, sensors, etc.) and/or output devices (display device, speaker devices, printer, motor, etc.).

Some examples of interfaced devices that can connect to I/O interface 1506 can include a display device 1520 that can be used to display content, e.g., images, video, and/or a user interface of an output application as described herein. Display device 1514 can be connected to computing device 1500 via local connections (e.g., display bus) and/or via networked connections and can be any suitable display device. The display device 1514 can include any suitable display device such as a liquid crystal display (LCD), light emitting diode (LED), or plasma display screen, cathode ray tube (CRT), television, monitor, touch screen, 3-D display screen, or other visual display device. For example display device 1514 can be a flat display screen provided on a mobile device, multiple display screens provided in a goggles device, or a monitor screen for a computer device.

The I/O interface 1506 can interface to other input and output devices. Some examples include one or more cameras, which can capture image frames based on detected scenes for updating panoramic image montages. Orientation sensors, e.g., gyroscopes and/or accelerometers, can provide sensor data indicating device orientation (which can correspond to view orientation in some implementations) and/or camera orientation. Some implementations can provide a microphone for capturing sound (e.g., voice commands, etc.), audio speaker devices for outputting sound, or other input and output devices.

For ease of illustration, FIG. 15 shows one block for the processor 1502, the memory 1504, the I/O interface 1506, the operating system 1508, and the peer-to-peer application 1510, respectively. These blocks may represent one or more processors or processing circuitries, operating systems, memories, I/O interfaces, applications, and/or software modules. In other implementations, computing device 1500 may not have all of the components shown and/or may have other elements including other types of elements instead of, or in addition to, those shown herein. While user devices (e.g., 102, 104, and 106) are described as performing blocks and operations as described in some implementations herein, any suitable component or combination of components of user devices (102, 104, and 106) or similar devices, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device (CPLD), etc.), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user's phone number or partial phone number, user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
obtaining, at a sender device, a public key of a receiver device;
receiving, at the sender device, a beacon signal transmitted by the receiver device, wherein the beacon signal includes an encoded value that is based on a salt value and the public key of the receiver device;
determining, by the sender device, that the encoded value of the beacon signal is decodable with the public key of the receiver device based on successfully obtaining the salt value by decoding the encoded value; and
when it is determined that the encoded value of the beacon signal is decodable with the public key of the receiver device, transmitting, by the sender device, a connection provisioning message, wherein the connection provisioning message includes an encrypted portion that is encrypted using the public key of the receiver device.

2. The computer-implemented method of claim 1, further comprising:
responsive to decoding the encoded value of the beacon signal, determining a match between the public key and a contacts database associated with the sender device.

3. The computer-implemented method of claim 1, further comprising determining a time at which the salt value was generated, and wherein transmitting the connection provisioning message is performed in response to determining that the time at which the salt value was generated is within a threshold time from a current time at the sender device.

4. The computer-implemented method of claim 1, further comprising:
when it is determined that the encoded value of the beacon signal is decodable with the public key of the receiver device:
transmitting from the sender device to the receiver device a request for personal identification number (PIN) verification including a PIN;
determining, based on input received from a user interface of the sender device, that the PIN transmitted to the receiver device is verified by the sender device; and
when the PIN is verified, transmitting the connection provisioning message from the sender device to the receiver device, wherein the encrypted portion of the connection provisioning message includes credentials to access a network associated with a transfer communication channel.

5. The computer-implemented method of claim 1, wherein a phone number is used as a private key and a part of the phone number is used as the public key.

6. The computer-implemented method of claim 1, wherein the encrypted portion of the connection provisioning message includes an identifier for a wireless network and a password for the wireless network.

7. The computer-implemented method of claim 6, wherein the wireless network includes a Wi-Fi hotspot.

8. The computer-implemented method of claim 1, wherein the beacon signal is received via a first communication channel, wherein the connection provisioning message is transmitted via the first communication channel, wherein the encrypted portion of the connection provisioning message includes access credentials for a second communication channel that is different from the first communication channel, wherein the beacon signal includes device capability information corresponding to device capabilities of the receiving device and wherein connection provisioning is performed based on the device capability information.

9. A computer-implemented method comprising:
generating, at a receiver device, a key pair that includes a public key and a private key;
transmitting, from the receiver device to a sender device, a beacon signal that includes a salt value and an encoded value based on the salt value and the public key, wherein the beacon signal is transmitted via a beacon signal communication channel, wherein the sender device is configured to decode the encoded value with the public key of the receiver device to determine the salt value;
receiving, at the receiver device, a connection provisioning message from a sender device, the connection provisioning message having an encrypted portion that includes credentials to access a network associated with a transfer communication channel;
determining if the encrypted portion of the connection provisioning message can be decrypted using the private key; and
when it is determined that the encrypted portion of the connection provisioning message can be decrypted with the private key:
establishing, at the receiver device, a secure connection to the network using the credentials in the encrypted portion of the connection provisioning message;
transmitting, from the receiver device, a content request message to the sender device via the secure connection;
receiving, at the receiver device, a content description message from the sender device in response to the content request message via the secure connection;
transmitting, from the receiver device, a download start message to the sender device via the secure connection; and
receiving, at the receiver device, one or more content download messages from the sender device via the secure connection.

10. The computer-implemented method of claim 9, wherein the connection provisioning message is included within the beacon signal.

11. The computer-implemented method of claim 10, wherein the beacon signal communication channel includes Bluetooth and the transfer communication channel includes one of Wi-Fi and Wi-Fi Direct.

12. The computer-implemented method of claim 9, wherein the salt value includes a time-based component configured to permit determination of a time that the salt value was generated at the receiver device.

13. The computer-implemented method of claim 9, wherein transmitting the beacon signal includes transmitting the beacon signal via Bluetooth Low Energy (LE).

14. The computer-implemented method of claim 9, wherein the public key includes a phone number associated with the receiver device.

15. The computer-implemented method of claim 14, wherein determining if the encrypted portion of the connection provisioning message can be decrypted using the private key of the receiver device further includes:
determining that the connection provisioning message cannot be decrypted using the private key of the receiver device; and when the connection provisioning message cannot be decrypted using the private key of the receiver, sending, from the receiver device to the sender device, an indication that a key used to encrypt the encrypted portion of the connection provisioning message is invalid.

16. A system comprising:

one or more processors coupled to a non-transitory computer readable medium having stored there on software instructions that, when executed by the one or more processors, cause the one or more processors to perform operations including:

obtaining, at a sender device, a public key of a receiver device;

receiving, at the sender device, a beacon signal transmitted by the receiver device, wherein the beacon signal includes an encoded value that is based on a salt value and the public key of the receiver device;

decoding if the encoded value of the beacon signal with the public key of the receiver device to determine the salt value; and when it is determined that the encoded value of the beacon signal is decodable with the public key of the receiver device:

establishing a PIN according to a key exchange protocol; and when the PIN is established, transmitting a connection provisioning message from the sender device to the receiver device, wherein the connection provisioning message includes an encrypted portion encrypted based on a key derived from the PIN established during the key exchange protocol, wherein the encrypted portion of the connection provisioning message includes credentials to access a network associated with a transfer communication channel.

17. The system of claim 16, wherein the key exchange protocol includes a Diffie-Hellman based key exchange.

18. The system of claim 16, wherein the operations further include:

responsive to decoding the encoded value of the beacon signal, determining a match between the public key and a contacts database associated with the sender device.

19. The system of claim 16, wherein the operations further include:

determining a time at which the salt value was generated based on the salt value, and wherein transmitting the connection provisioning message is performed in response to determining that the time at which the salt value was generated is within a threshold time from a current time at the receiver device.

20. The system of claim 16, wherein the beacon signal is received over a beacon communication channel that includes Bluetooth and the transfer communication channel includes Wi-Fi.

* * * * *